(12) United States Patent
Chi et al.

(10) Patent No.: US 9,361,375 B2
(45) Date of Patent: Jun. 7, 2016

(54) BUILDING A RESEARCH DOCUMENT BASED ON IMPLICIT/EXPLICIT ACTIONS

(75) Inventors: Liang-Yu Chi, San Francisco, CA (US); Ashley Hall, Menlo Park, CA (US)

(73) Assignee: EXCALIBUR IP, LLC, Sunnyvale, CA (US)

(*) Notice: Subject to any disclaimer, the term of this patent is extended or adjusted under 35 U.S.C. 154(b) by 440 days.

(21) Appl. No.: 12/181,796

(22) Filed: Jul. 29, 2008

(65) Prior Publication Data

US 2010/0030763 A1 Feb. 4, 2010

(51) Int. Cl.
G06F 7/00 (2006.01)
G06F 17/30 (2006.01)

(52) U.S. Cl.
CPC ............... *G06F 17/30864* (2013.01)

(58) Field of Classification Search
CPC .............. G06F 17/30241; G06F 17/3087
USPC ......................................................... 707/771
See application file for complete search history.

(56) References Cited

U.S. PATENT DOCUMENTS

| | | | | |
|---|---|---|---|---|
| 5,241,671 | A * | 8/1993 | Reed et al. | |
| 5,634,051 | A * | 5/1997 | Thomson | |
| 5,953,718 | A * | 9/1999 | Wical | |
| 6,366,923 | B1 * | 4/2002 | Lenk et al. | 707/706 |
| 6,473,752 | B1 * | 10/2002 | Fleming, III | 707/708 |
| 6,675,213 | B1 * | 1/2004 | Schmonsees | 709/225 |
| 7,188,141 | B2 * | 3/2007 | Novaes | 709/205 |
| 7,249,315 | B2 * | 7/2007 | Moetteli | 715/234 |
| 7,353,246 | B1 * | 4/2008 | Rosen et al. | 709/202 |
| 7,519,573 | B2 * | 4/2009 | Helfman et al. | |
| 7,548,909 | B2 * | 6/2009 | Rappaport et al. | |
| 2001/0037334 | A1 * | 11/2001 | Valentine | 707/10 |
| 2002/0091836 | A1 | 7/2002 | Moetteli | |
| 2002/0196273 | A1 * | 12/2002 | Krause | 345/738 |
| 2003/0014399 | A1 | 1/2003 | Hansen et al. | |

(Continued)

FOREIGN PATENT DOCUMENTS

| | | |
|---|---|---|
| TW | 200825971 A | 6/2008 |
| WO | 2010014525 A2 | 2/2010 |

(Continued)

OTHER PUBLICATIONS

Agarwal, "View or Search Your Web Browser History in a Picture Timeline", Digital Inspiration, Jun. 13, 2007, 4 pages.

(Continued)

*Primary Examiner* — Cheyne D Ly
(74) *Attorney, Agent, or Firm* — Pillsbury Winthrop Shaw Pittman LLP

(57) ABSTRACT

A system and method is described that maintains a record of research performed by a user of an information retrieval system in a manner that reduces the amount of work required by the user to maintain such a record. The system and method obtains information implicitly generated through the interaction of the user with the information retrieval system while performing research and uses such information to automatically construct a research document for the user about a particular research topic. The research document or a means of access thereto is then presented to the user. The research document is configured to maintain both the implicitly-generated data recorded by the system as well as data explicitly provided or collected by the user, such as retrieved document content and user notes, in a manner that is highly-organized and easy to access, augment, and maintain.

35 Claims, 17 Drawing Sheets

(56) References Cited

U.S. PATENT DOCUMENTS

| | | | |
|---|---|---|---|
| 2003/0046281 A1* | 3/2003 | Son | 707/6 |
| 2004/0193603 A1* | 9/2004 | Ljubicich | 707/9 |
| 2004/0249787 A1 | 12/2004 | Chundi et al. | |
| 2006/0064341 A1 | 3/2006 | Frengut et al. | |
| 2007/0282663 A1* | 12/2007 | Barlament | 705/10 |
| 2008/0147631 A1 | 6/2008 | Leffingwell et al. | |
| 2008/0148193 A1* | 6/2008 | Moetteli | 715/854 |
| 2008/0154859 A1 | 6/2008 | Chi et al. | |
| 2008/0319944 A1* | 12/2008 | Venolia et al. | 707/3 |
| 2009/0187818 A1* | 7/2009 | Compton et al. | 715/234 |
| 2009/0319555 A1* | 12/2009 | Ragno et al. | 707/102 |
| 2010/0003190 A1 | 1/2010 | Kolyada et al. | |
| 2010/0017383 A1* | 1/2010 | Gaucas | 707/5 |
| 2010/0030736 A1 | 2/2010 | Chi et al. | |
| 2011/0208776 A1* | 8/2011 | Lee et al. | 707/769 |

FOREIGN PATENT DOCUMENTS

| | | |
|---|---|---|
| WO | 2010014527 A2 | 2/2010 |
| WO | 2010014525 A3 | 4/2010 |
| WO | 2010014527 A3 | 4/2010 |

OTHER PUBLICATIONS

Lennartz, "Should Links Open in New Windows?", Jul. 1, 2008, 8 pages.

Office Action Received for Taiwanese Patent Application No. 98124769, mailed on Dec. 10, 2012, 7 pages of Taiwanese Office action and 4 pages of English translation.

* cited by examiner

BUILDING A RESEARCH DOCUMENT BASED ON IMPLICIT/EXPLICIT ACTIONS

BACKGROUND OF THE INVENTION

1. Field of the Invention

The present invention relates to research tools for collecting and organizing information obtained via an information retrieval system, such as information obtained via the World Wide Web.

2. Background

The increase in available content on the World Wide Web and innovations in Internet search technology have changed the way people access information. By searching the Web, a user can now perform a wide variety of research-based tasks such as planning a vacation, purchasing a car, or performing academic research. While finding sought-after information on the Web has generally become easier, collecting and organizing Web research and coming back to it remains challenging. This is due, in part, to the fact that Web-based research sessions may contain many queries, span multiple sessions, involve gathering large amounts of content, and change in focus over time as new topics of research emerge.

While performing research on the Web, users often need to painstakingly record the URLs (Uniform Resource Locators) associated with Web pages that they visit, the search terms that work best for them, and information from the destination pages they reach. Users may record such data in written form (e.g., by writing such data in a journal or on Post-it® notes) or in electronic form (e.g., by cutting and pasting such data into a word processing document), thereby creating impromptu research documents that may subsequently be used to explore their work in a particular area. Other conventional methods for collecting and organizing such data include saving bookmarks or tabs associated with Web pages, storing Web pages locally, or using basic scratchpad programs such as Google™ Notebook.

Each of these methods and tools require a user to proactively sort through, select and record information that is suitable for inclusion in a formal or informal Web research record. This can be a time-consuming, tedious and sometimes confusing task as the user navigates between different Web pages and browser windows. Performing such a task will inevitably slow down the research process and generally make it more unpleasant. In each case, the quality of the research record generated is directly related to the amount of effort expended by the user in meticulously recording URLs, search terms and Web content. Furthermore, depending upon the medium used for recording and the level of effort expended by the user, the resulting research record may be messy and disorganized, thereby compromising its future usefulness.

What is needed then is a means for allowing users to maintain a record of research performed using an information retrieval system that avoids the shortcomings of the foregoing conventional approaches.

BRIEF SUMMARY OF THE INVENTION

A system and method is described herein that maintains a record of research performed by a user of an information retrieval system in a manner that advantageously reduces the amount of work required by the user to maintain such a record. In accordance with an embodiment of the invention, the system and method obtains information implicitly generated through the interaction of the user with the information retrieval system while performing research and uses such information to automatically construct a research document for the user about a particular research topic. The research document or a means of access thereto is then presented to the user. In accordance with further embodiments of the present invention, the research document is configured to maintain both the implicitly-generated data recorded by the system as well as data explicitly provided or collected by the user, such as retrieved document content and user notes, in a manner that is highly-organized and easy to access, augment, and maintain.

In particular, a method for maintaining a record of research performed by a user of an information retrieval system is described herein. In accordance with the method, first information is obtained. The first information relates to one or more queries submitted to a search engine by a user. Second information is also obtained. The second information relates to one or more documents identified by the search engine responsive to receiving the one or more queries and accessed by the user via the search engine. Based on at least the first information and the second information, a research document is automatically generated, wherein the research document identifies a research topic, at least one query among the one or more queries that is deemed related to the research topic, and at least one document among the one or more documents that is deemed related to the research topic. The research document is then presented to the user.

A system is also described herein. The system includes a search engine and a research session manager connected to the search engine. The search engine is configured to receive one or more queries submitted by a user, to identify documents responsive to receiving each of the one or more queries, and to facilitate access by the user to the identified documents. The research session manager is configured to obtain first information related to the one or more queries and second information related to one or more of the identified documents accessed by the user via the search engine, to automatically generate a research document based on at least the first information and the second information, and to present the research document to the user. The research document identifies a research topic, at least one query among the one or more queries that is deemed related to the research topic, and at least one document among the one or more of the identified documents accessed by the user that is deemed related to the research topic.

A computer program product is also described herein. The computer program product includes a computer-readable medium having computer program logic recorded thereon for enabling a processor to maintain a record of research performed by a user of an information retrieval system. The computer program logic includes first means, second means, third means and fourth means. The first means are for enabling the processor to obtain first information related to one or more queries submitted to a search engine by a user. The second means are for enabling the processor to obtain second information related to one or more documents identified by the search engine responsive to receiving the one or more queries and accessed by the user via the search engine. The third means are for enabling the processor to generate a research document based on at least the first information and the second information, wherein the research document identifies a research topic, at least one query among the one or more queries that is deemed related to the research topic, and at least one document among the one or more documents that is deemed related to the research topic. The fourth means are for enabling the processor to present the research document to the user.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
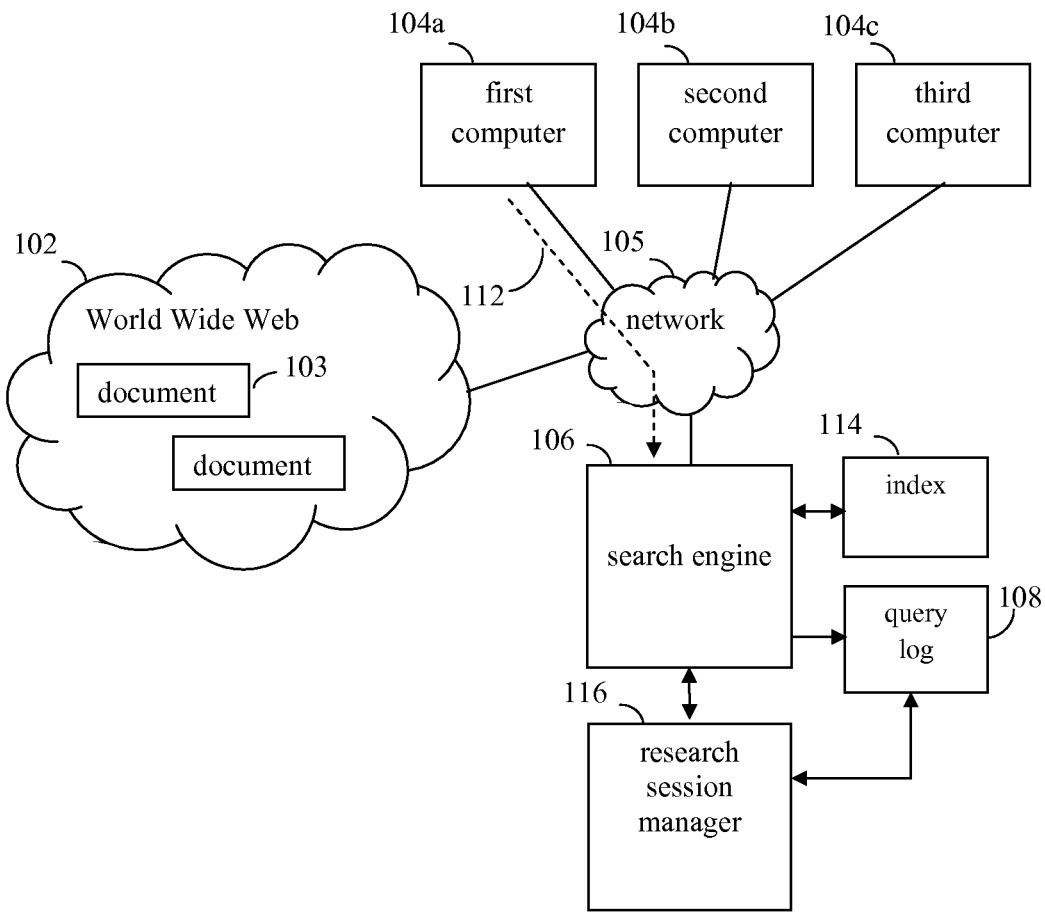
FIG. 1 is a block diagram of an information retrieval system in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

FIG. 1 is a block diagram of an information retrieval system 100 in which an embodiment of the present invention may be implemented. System 100 is described herein for illustrative purposes only, and it is noted that embodiments of the present invention may be implemented in alternative environments. As shown in FIG. 1, system 100 includes a search engine 106. One or more computers 104, such as first computer 104a, second computer 104b and third computer 104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. In embodiments where network 105 includes the Internet, a collection of documents, including a document 103, which form a portion of World Wide Web 102, are available for retrieval by computers 104 through network 105. On the Internet, documents may be identified/located by a uniform resource locator (URL), such as http://www.yahoo.com, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to search engine 106 through network 105. Search engine 106 receives query 112, and analyzes index 114 to identify documents relevant to query 112. For example, search engine 106 may identify a set of documents indexed by index 114 that include terms of query 112. The set of documents may include any number of documents, including tens, hundreds, thousands, millions, or even billions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents.

The list of the returned documents may be provided to a user in the context of a document termed a "search results page." As is known to persons skilled in the relevant art(s), a search results page may include user interface elements, such as hypertext links, associated with each returned document. In one implementation, responsive to the activation of such a user interface element by a user, search engine 106 will cause the returned document associated with the user interface element to be presented to the user. The presentation may involve the delivery of the document from a document server (not shown in FIG. 1) to any one of user computers 104a-104c.

Search engine 106 may be implemented in hardware, software, firmware, or any combination thereof. For example, search engine 106 may include software/firmware that executes in one or more processors of one or more computer systems, such as one or more servers. Examples of search engine 106 that are accessible through network 105 include, but are not limited to, Yahoo! Search™ (at http://www.yahoo.com), Ask.com™ (at http://www.ask.com), and Google™ (at http://www.google.com).

Figure 2:
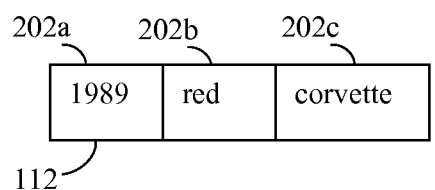
FIG. 2 shows an example query that may be submitted by a user to a search engine.

FIG. 2 shows an example query 112 that may be submitted by a user of one of computers 104a-104c of FIG. 1 to search engine 106. As shown in FIG. 2, query 112 includes one or more terms 202, such as first term 202a, second term 202b and third term 202c. Any number of terms 202 may be present in a query. As shown in FIG. 2, terms 202a, 202b and 202c of query 112 are "1989," "red," and "corvette," respectively. Search engine 106 applies these terms 202a-202c to index 114 to retrieve a document locator, such as a URL, for one or more indexed documents that match "1989," "red," and "corvette," and may order the list of documents according to a ranking.

As also shown in FIG. 1, search engine 106 may generate a query log 108. Query log 108 is a record of searches that are made using search engine 106. Query log 108 may include a list of queries, by listing query terms (e.g., terms 202 of query 112) along with further information/attributes for each query, such as a list of documents resulting from the query, a list/indication of documents in the list that were selected/clicked on ("clicked") by a user reviewing the list, a ranking of clicked documents, a timestamp indicating when the query is received by search engine 106, an IP (internet protocol) address identifying a unique device (e.g., a computer, cell phone, etc.) from which the query terms were submitted, an identifier associated with a user who submits the query terms (e.g., a user identifier in a web browser cookie), and/or further information/attributes.

As further shown in FIG. 1, system 100 also includes a research session manager 116 connected to search engine 106 and query log 108. Research session manager 116 is configured to maintain a record of research performed by users of computers 104a-104c. In particular, research session manager is configured to obtain information implicitly generated through the interaction of a user with information retrieval system 100 while performing research and to use such information to automatically construct a research document for the user about a particular research topic. The research document or a means of access thereto is then presented to the user. In an embodiment, the research document or a means of access thereto is presented to the user via a search results page generated by search engine 106 and delivered to a computer 104a-104c over network 105. The manner in which research session manager operates to automatically generate a research document and present it to a user will be described in more detail below.

The research document generated by research session manager 116 may be configured to maintain both the implicitly-generated data recorded by research session manager 116 as well as data explicitly provided or collected by a user of any of computers 104a-104c, such as retrieved document content and user notes, in a manner that is highly-organized and easy to access, augment, and maintain. Details about different features and aspects of various research documents that may be generated by research session manager 116 in accordance with embodiments of the present invention will be described below.

Like search engine 106, research session manager 116 may be implemented in hardware, software, firmware, or any combination thereof. For example, research session manager 116 may include software/firmware that executes in one or more processors of one or more computer systems, such as one or more servers.

Figure 3:
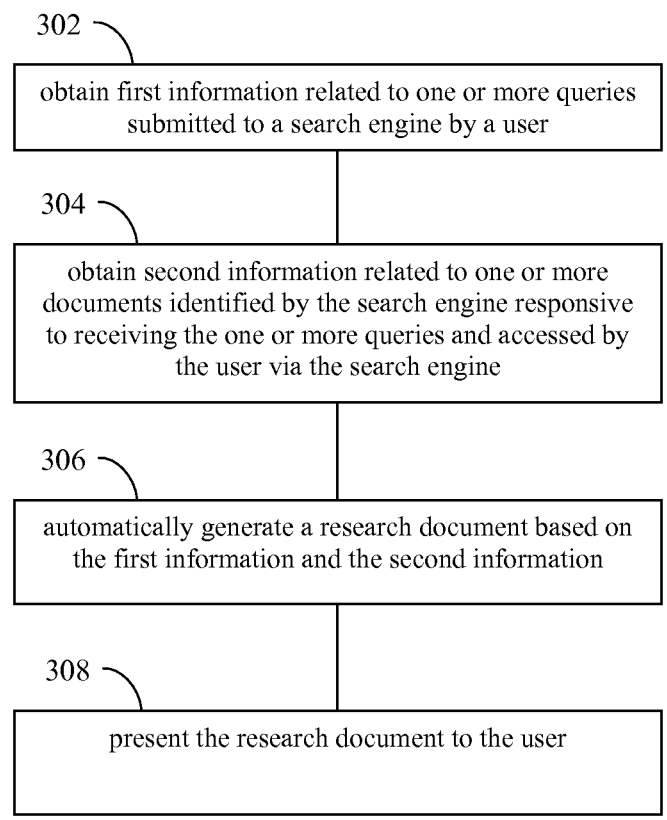
FIG. 3 depicts a flowchart of a method for maintaining a record of research performed by a user of an information retrieval system in accordance with an embodiment of the present invention.

B. Method for Maintaining Record of User Research in Accordance with an Embodiment of the Present Invention FIG. 3 depicts a flowchart 300 of a method for maintaining a record of research performed by a user of an information retrieval system in accordance with an embodiment of the present invention. The method of flowchart 300 will now be described in reference to elements of information retrieval system 100. However, it is noted that the method is not limited to that implementation.

As shown in FIG. 3, the method of flowchart 300 begins at step 302 in which research session manager 116 obtains first information related to one or more queries submitted to search engine 106 by a user. The user may be, for example, any of the users of computers 104a-104c and the queries may be submitted from any one of computers 104a-104c to search engine 106 via network 105 in a manner previously described. The first information related to the one or more queries may comprise, for example, the term(s) included in each query.

At step 304, research session manager 116 obtains second information related to one or more documents identified by search engine 106 responsive to receiving the one or more queries and accessed by the user via search engine 106. The one or more documents may have been accessed by the user via various search results pages generated and delivered by search engine 106 to any of user computers 104a-104c in a manner discussed above. The second information may comprise, for example, a URL or other unique identifier associated with each of the one or more documents. The second information may also comprise other information associated with each of the one or more documents including but not limited to a title of the document, text of the document, an abstract or summary of the document generated by search engine 106, a tag or tags associated with the document, or various metadata associated with the document.

Depending upon the implementation, research session manager 116 may obtain the first information and the second information directly from search engine 106, from query log 108, from other logs maintained by the same entity that maintains search engine 106, or from any of client computers 104a-104c.

At step 306, research session manager 116 automatically generates a research document based at least on the first information and the second information. The research document may include, for example, an identification of a research topic, an identification of at least one query among the one or more queries that is deemed related to the research topic, and an identification of at least one document among the one or more documents that is deemed related to the research topic. The manner in which research session manager 116 automatically generates the research document and the information included therein will be described in more detail below.

At step 308, research session manager 116 presents the research document to the user. This step may entail delivering the research document to any of computers 104a-104c for display to the user via an associated display device. Depending upon the implementation, the research document may be displayed to the user in a dedicated window or as an integrated part of a search results page produced by search engine 106. However, these examples are not intended to be limiting, and the research document may be presented to the user using other techniques as well. Various ways in which research session manager 116 presents the research document to the user will be described in more detail below.

In one embodiment, presenting the research document to the user may comprise presenting a means for accessing the research document to the user. As will be described elsewhere herein, such means may comprise a prompt or user interface element that is inserted within, or overlaid on top of, a search results page or other document provided by search engine 106 to any one of computers 104a-104c. In accordance with such an embodiment, research session manager 116 may present the research document to the user responsive to activation by the user of the means for accessing the research document.

In a further embodiment, the foregoing method may further include the obtaining of third information by research session manager 116, wherein the third information includes behavioral signals provided by the user while interacting with information retrieval system 100. Such behavioral signals may be indicative of the user's interest in target content. For example, such behavioral signals may include an amount of time a user spent viewing one or more documents accessed via a search results page generated and delivered by search engine 106. Other behavioral signals that may be included in the third information may include user actions with respect to a user interface provided by information retrieval system 100 such as scrolling, mouse-movements and text selection. In such an embodiment, research session manager 116 may generate a research document based on the first information, the second information and the third information.

1. Automatic Research Document Generation

Figure 4:
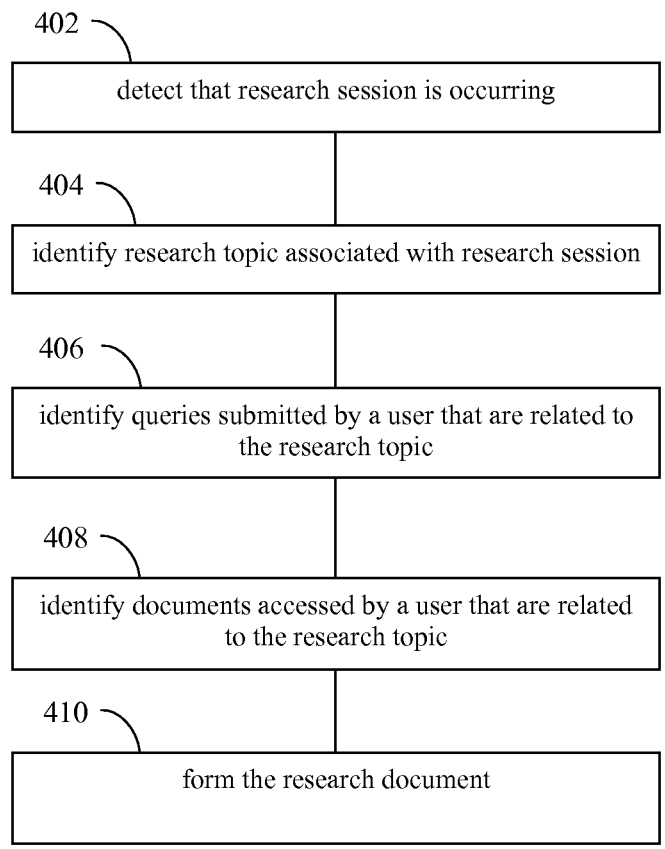
FIG. 4 depicts a flowchart of various steps performed in automatically generating a research document in accordance with an embodiment of the present invention.

FIG. 4 depicts a flowchart 400 of various steps performed in automatically generating a research document in accordance with an embodiment of the present invention. As shown in FIG. 4, the steps of flowchart 400 include detecting that a research session is occurring 402, identifying a research topic associated with the research session 404, identifying queries submitted by a user that are associated with the research topic 406, identifying documents accessed by the user that are associated with a research topic 408, and then forming the research document 410. Each of these steps will now be described. Although these steps may be described with continued reference to elements of information retrieval system 100, it is noted that the steps are not limited to that implementation.

a. Research Session Detection

Research session manager 116 includes logic that is configured to automatically detect whether or not a user of search engine 106 is conducting research about a particular topic. The manner in which such logic operates is described in detail in commonly-owned, co-pending U.S. patent application Ser. No. 12/181,912, entitled "Research Tool Access Based on Research Session Detection," which was filed on Jul. 29, 2008 (now U.S. Pat. No. 8,832,098 issued Sep. 9, 2014), the entirety of which is incorporate by reference herein (hereinafter "Research Session Detection application").

As described in the Research Session Detection application, various factors may be considered by research session manager 116 to determine whether or not a user of search engine 106 is conducting a research session about a particular topic. Each such factor may used alone or in combination with other factors to discern whether the user has a research intent based on an aspect or result of the interaction of the user with search engine 106. These factors may include, but are not limited to, a length of an information retrieval session, a number of documents accessed during an information retrieval session, a similarity between queries submitted by a user, a similarity between documents identified by search engine 106 responsive to such queries, or an indication that the user initiated or conducted a research session about a particular topic during a prior information retrieval session. Where a combination of factors is considered, each factor may be weighted in arriving at the ultimate determination of whether a research session is being conducted.

b. Research Topic Identification

Research session manager 116 also includes logic that is configured to identify a research topic to which the research session is related. In one embodiment, research session manager 116 performs this function by analyzing queries submitted by a user of search engine 106 and/or information associated with documents identified by search engine 106 responsive to such queries. The documents subject to analysis may be further limited to only those documents identified by search engine 106 that were subsequently accessed by the user. The information analyzed may be obtained by research session manager 116 during steps 302 and 304 of flowchart 300 as described above in reference to FIG. 3.

In one embodiment, the research topic is identified by identifying common terms or underlying concepts among the terms of the analyzed queries and/or among the information associated with the analyzed documents. The information associated with the analyzed documents may include but is not limited to text within the documents, titles of the documents, URLs associated with the documents, abstracts or summaries of the documents generated by search engine 106, tags associated with the documents, or various metadata associated with the documents. A variety of techniques known in the art for identifying common terms or underlying concepts among strings of text may be used.

The identification of common terms or underlying concepts among the terms of the analyzed queries and/or the information associated with the analyzed documents may also be considered as a factor in detecting whether a research session is actually occurring as discussed above above in reference to step 402. Thus, in one embodiment, the logic that detects a research session and the logic that identifies the research topic are integrated.

c. Identification of Queries Related to the Research Topic

Research session manager 116 is further configured to identify queries submitted by the user to search engine 106 that are related to the identified research topic. Research session manager 116 may perform this function by analyzing the terms of the queries and/or by analyzing information associated with the documents identified by search engine 106 responsive to receiving the queries to determine if such terms or information are similar to the terms used to describe or identify the research topic. The identification of a query that is related to the research topic may also occur as a by-product of detecting a research session and/or identifying the topic of the research session.

In one embodiment, research session manager 116 is configured to include each query submitted by the user in either a first set of queries that is deemed related to the research topic or in a second set of queries that is deemed unrelated to the research topic. Then, during presentation of the research document, research session manager 116 distinguishes between the first and second sets of queries. In particular, as will be described below, the research document may include a display area for reviewing the first set of queries and a user interface element for providing access to the second set of queries.

d. Identification of Documents Related to the Research Topic

Research session manager 116 is also configured to identify documents identified by search engine 106 and accessed by the user via search engine 106 that are deemed related to the research topic. In one embodiment, research session manager 116 performs this function by deeming any document accessed by the user via search engine 106 that was identified in response to a query deemed related to the research topic as related to the research topic. As noted above, the determination of whether a query is related to the research topic may take into an account an analysis of the query terms and/or information associated with the documents identified by search engine 106 in response to the query.

In one embodiment, research session manager 116 is configured to track or estimate an amount of time that a user spends reviewing a document deemed related to the research topic. Based on the amount of time, research session manager 116 includes the document in either a first set of documents that are deemed briefly visited by the user or in a second set of documents deemed more than briefly visited by the user. Then, during presentation of the research document, research session manager 116 distinguishes between the first and second sets of documents. In particular, as will be described below, the research document may include a display area for reviewing information about the second set of documents and a user interface element for providing access to information about the first set of documents.

In a further embodiment, research session manager 116 is also configured to maintain an association between each document deemed related to the research topic and the query submitted by the user for which such document was identified by search engine 106. In this way, research session manager 116 can maintain a parent-child relationship between relevant queries and relevant documents retrieved responsive to those queries. Then, during presentation of the research documents, research session manager 116 presents information about each document deemed related to the research topic in association with the query submitted by the user for which such document was identified.

e. Research Document Formation

After research session manager 116 has detected that a research session is occurring, identified a research topic associated with the research session, and identified one or more queries and one or more documents related to the research topic, research session manager 116 then forms a research document based on this information. The research document, or a means for accessing the research document, is then presented to the user. Various ways in which the research document, or a means for accessing the research document, is presented to the user will be described below. In one implementation, research session manager 116 forms the research document only when certain conditions necessary for presenting the research document, or a means for access thereto, to the user have been met.

2. Research Document Presentation

As described above in reference to step 308 of flowchart 300, research session manager 116 is configured to present the research document to the user. The presentation of the research document may be performed automatically responsive to detection of a research session by research session manager 116 (as discussed above in Section B.1.a). Alternatively, the presentation of the research document may be performed responsive to user input received via a user interface to information retrieval system 100. Such user input may comprise the activation of a user interface element or other means for accessing the research document included within a search results page or other document presented from search engine 106 to any of computers 104a-104c. The user interface element or other means for accessing the research document may be provided to the user responsive to the detection of a research session by research session manager 116.

a. Means for Accessing Research Document

Various example means for accessing a research document generated by research session manager 116 will now be described. Each of these examples will be described in the context of or in relation to a search results page delivered from search engine 106 to any of computers 104a-104c. However, the invention is not limited to such example implementations and other means for accessing the research document may be used.

Figure 5:
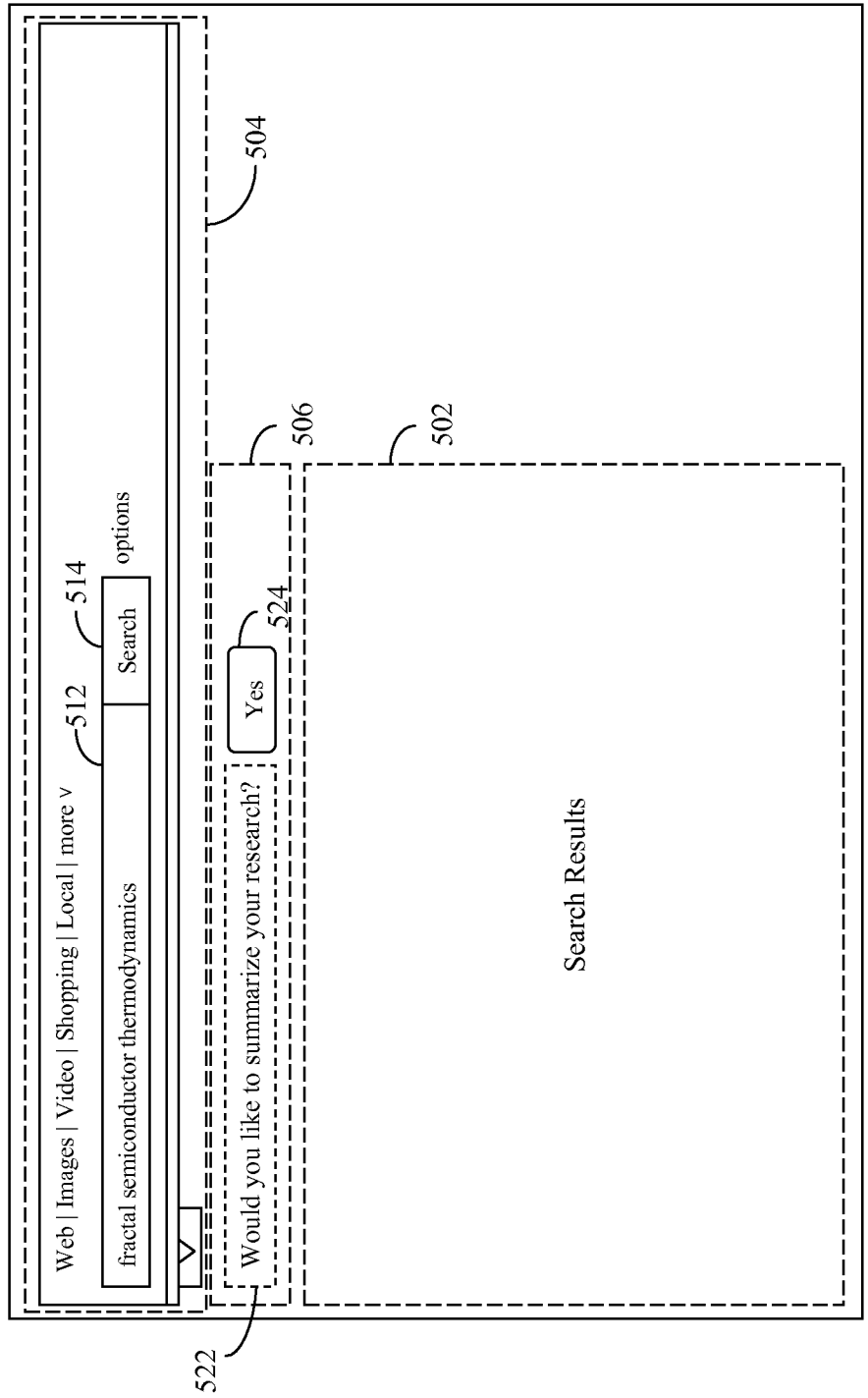
FIG. 5 is an illustration of a search results page that includes a means for accessing a research document in accordance with an embodiment of the present invention.

As a first example, FIG. 5 depicts a search results page 500 that includes a means for accessing a research document in accordance with an embodiment of the present invention. As noted above, search results page 500 may be presented to a user by search engine 106. As shown in FIG. 5, search results page 500 includes a search results section 502 and a header section 504. Search results section 502 is used to display information about documents identified by search engine 106 in response to the submission of a search query by a user. Header section 504 includes a data entry box 512 and a search button 514. Data entry box 512 defines a user-editable area into which one or more query terms may be entered. Search button 514 comprises an interface element that, when activated by a user, causes search engine 106 to execute a document search based on the query term(s) entered in data entry box 512. In search results page 500, data entry box 512 includes the query terms "fractal semiconductor thermodynamics." These query terms are intended to represent query terms that were used by search engine 106 to identify documents described in search results section 502.

As further shown in FIG. 5, search results page 500 also includes a research document access section 506. Research document access section 506 may be automatically included within search results page 500 responsive to detection of a research session by research session manager 116. Research document access section 506 comprises an invitation portion 522 and a research document activation button 524. Invitation portion 522 includes text that asks the user whether or not the user would like to summarize his/her research. Research document activation button 524 comprises an interface element that, when activated by a user, causes a research document to be displayed to the user. The research document may be displayed, for example, in a new window that is overlaid over a window in which search results page 500 is displayed. As noted above, the research document pertains to subject matter about which the user has been conducting research.

Figure 6:
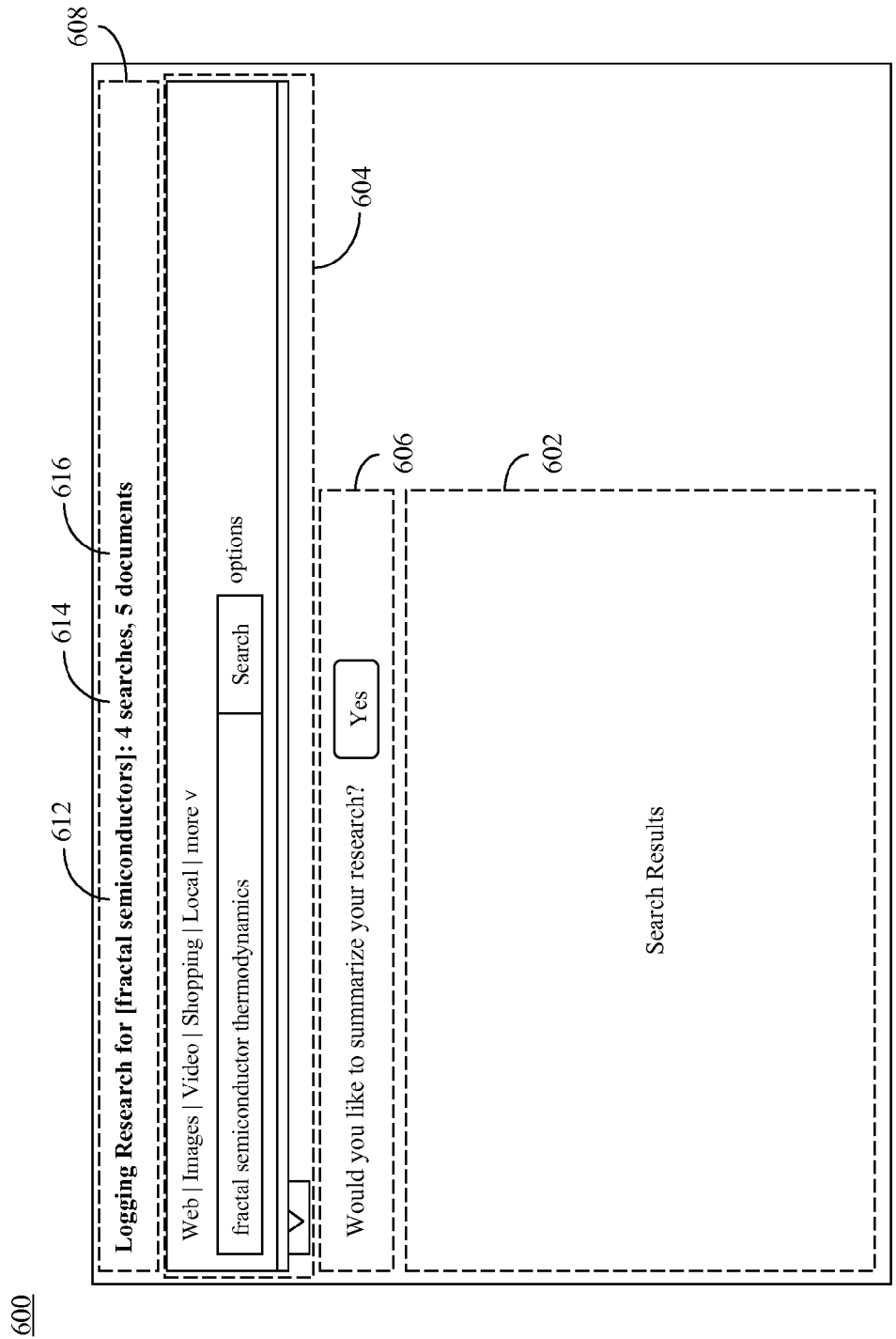
FIG. 6 is an illustration of a search results page that includes a means for accessing a research document and a research session status section in accordance with an embodiment of the present invention.

FIG. 6 depicts an alternative search results page 600 that includes a means for accessing a research document in accordance with an embodiment of the present invention. Search results page 600 may also be presented to a user by search engine 106. As shown in FIG. 6, search results page 600 includes a search results section 602, a header section 604, and a research document access section 606. These sections are essentially the same as search results section 502, header section 504 and research tool access session 506, respectively, as described above with respect to search results page 500 and serve a like function.

As further shown in FIG. 6, search results page 600 also includes a research session status section 608. Like research document access section 606, research session status section 608 may be automatically included within search results page 600 responsive to detection of a research session by research session manager 116. Research session status section 608 is intended to indicate to a user that research is being logged for the user about a particular topic. Research session status section 608 includes a description of a topic about which research is being logged 612, which as shown in FIG. 6 is "fractal semiconductors." The description of the topic may be derived, for example, from an analysis of search queries submitted by the user and/or documents identified by search engine 106 responsive to such queries, as described above. Research session status section 608 also includes an indication of a number of searches performed by the user in relation to the particular topic 614 and an indication of the number of documents accessed by the user relating to the particular topic 616.

Figure 7:
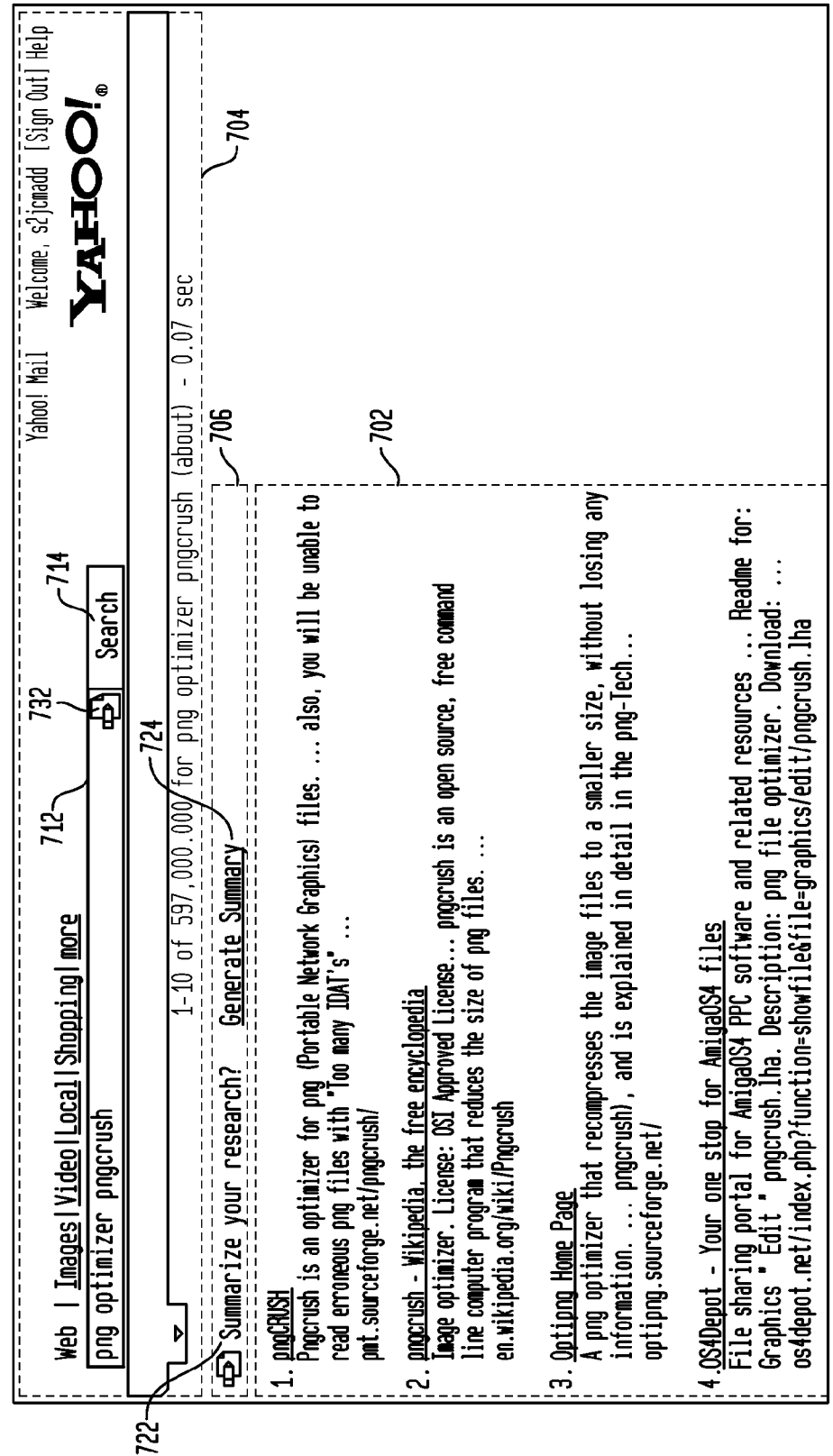
FIG. 7 is an illustration of a search results page that includes a means for accessing a research document and a research document activation icon in accordance with an embodiment of the present invention.

FIG. 7 depicts a further version of a search results page 700 that includes a means for accessing a research document in accordance with an embodiment of the present invention. Like search results page 500 and 600, search results page 700 includes a search results section 702, a header section 704 and a research document access section 706. Research document access section 706 may be automatically included within search results page 700 responsive to detection of a research session by research session manager 116. Research document access section 706 includes an invitation portion 722 and a research document activation link 724. Invitation portion 722 includes text that asks the user whether or not the user would like to summarize his/her research. Research document activation link 724 comprises an interface element that, when activated by a user, causes a research document to be displayed to the user. The research document may be displayed, for example, in a new window that is overlaid over a window in which search results page 700 is displayed.

As further shown in FIG. 7, header section 704 of search results page 700 includes a data entry box 712 and a search button 714. Generally speaking, these interface elements serve a similar function to data entry box 512 and search button 514 of search results page 500, respectively. However, unlike data entry box 512 of search results page 500, data entry box 712 of search results page 700 also includes a research document activation icon 732. Research document activation icon 732 is an interface element that, when activated by a user, provides access to a research document in a like manner to research document activation link 724. However, unlike research document activation link 724, which is included in search results page 700 only when a research session has been detected by research session manager 116, research document activation icon 732 is displayed regardless of whether or not a research session has been detected. Research document activation icon 732 thus provides a more persistent means for a user to initiate a research document. This may be useful in situations in which a user has not yet begun a research session but wishes to initiate a research document anyway or a situation in which the user is engaged in a research session but research session manager 116 has failed to detect that fact. In some embodiments, activation of research document activation icon 732 will bring up a menu of research documents that have been compiled by or on behalf of a user and the selection of one of these research documents will then cause the selected research document to be displayed.

Figure 8:
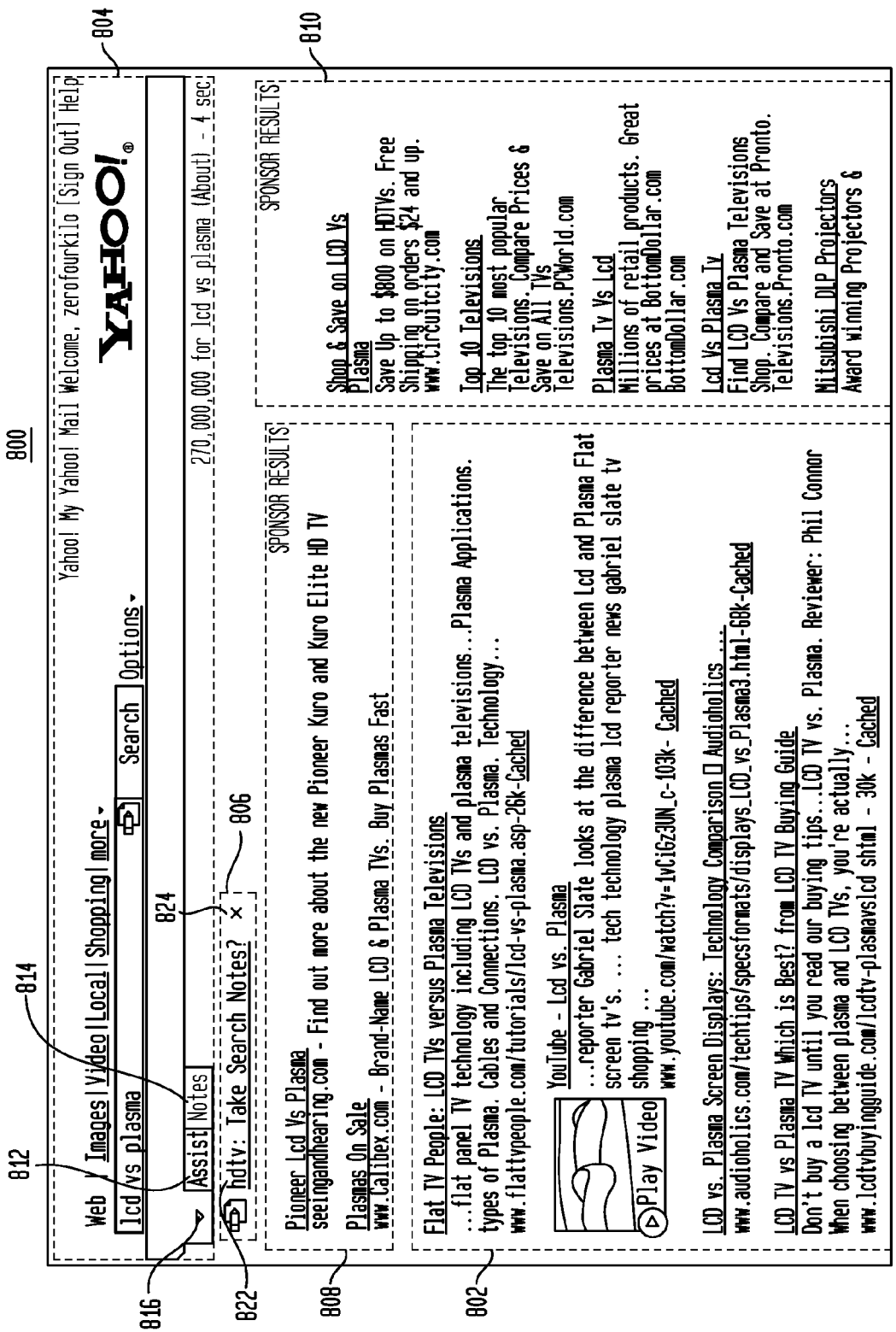
FIG. 8 is an illustration of a search results page that includes a means for accessing a research document implemented as an on-page drop down window or panel in accordance with an embodiment of the present invention.

FIG. 8 illustrates a search results page 800 that includes a means for accessing a research document implemented as an on-page drop down window or panel in accordance with an embodiment of the present invention. As shown in FIG. 8, search results page 800 includes a search results section 802, a header section 804, a research document access section 806, and two sections 808 and 810 dedicated to sponsored search results. Research document access section 806 may be automatically included within search results page 800 responsive to detection of a research session by research session manager 116. Research document access section 806 includes a research document activation link 822. Research document activation link 822 is an interface element that, when activated by a user, causes a research document to be displayed to the user. Research document activation link 822 advantageously comprises text that describes the topic of the research session that has been detected as well as text that asks the user whether or not the user would like to take notes about his/her research. As shown in FIG. 8, the topic of the research session as detected by research session manager 116 is "hdtv." Research document access section 806 also includes a cancellation element 824 (denoted with an "X") that allows a user to decline the invitation to access the research document. When activated by a user, cancellation element 824 causes research document access section 806 to be removed from search results page 800 and causes any logged research session results to be discarded.

If a user activates research document activation link 822, then a research document is displayed to the user in an on-page drop down window within search results page 800. The on-page drop down window extends from beneath header section 804. In particular, as shown in FIG. 8, two on-page drop down windows are accessible from a tab at the bottom of header section 804—a first tab portion 812, denoted "Assist,"

facilitates access to an assistance tool that is intended to help a user in formulating a search query and locating desired information while a second tab portion 814, denoted "Notes," facilitates access to the research document. Accessing either of these features involves selecting the appropriate tab portion and then activating an expansion element 816. The use of an on-page drop down window or panel to display the research document as opposed to a separate window may improve the user experience by avoiding or at least mitigating window management issues while performing research.

Figure 9:
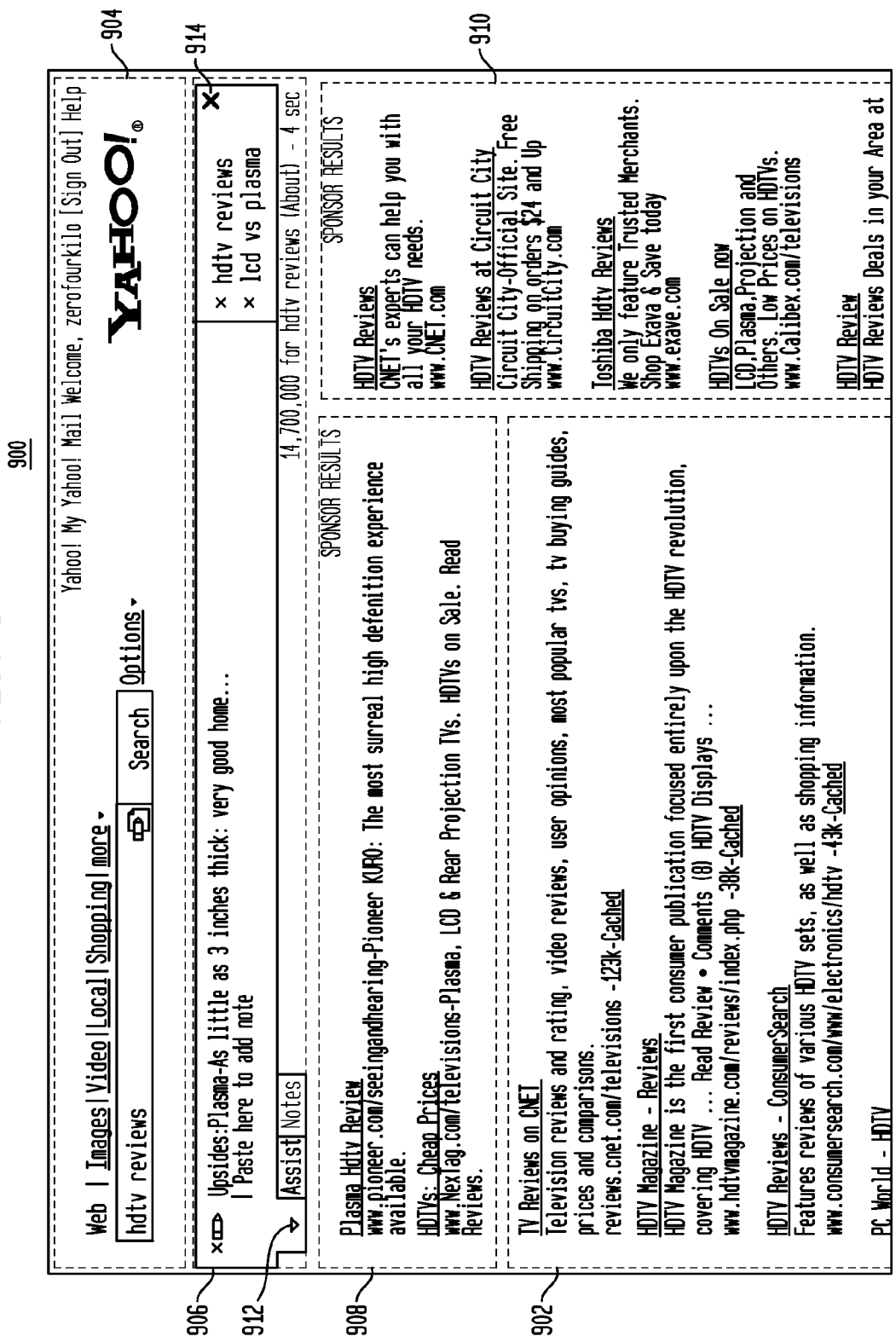
FIG. 9 is an illustration of another search results page that includes a means for accessing a research document implemented as an on-page drop down window or panel in accordance with an embodiment of the present invention.

FIG. 9 depicts another search results page 900 that includes a means for accessing a research document implemented as an on-page drop down window or panel in accordance with an embodiment of the present invention. As shown in FIG. 9, search results page 900 includes a search results section 902, a header section 904, a research document access section 906, and two sections 908 and 910 dedicated to sponsored search results. In search results page 900, research document access section 906 comprises a condensed version of the research document that appears in an on-page drop down window or panel below header section 904. The condensed version of the research document may appear in the on-page drop down window responsive to detection of a research session by research session manager 116. To access a complete or expanded version of the research document, the user must activate an expansion element 912 within research document access section 906. Research document access section 906 also includes a cancellation element 914 (denoted with an "X") that allows a user to cease viewing the condensed version of the research document. When activated by a user, cancellation element 914 causes the window within research document access section 906 to be closed and causes any logged research session results to be discarded.

Figure 10:
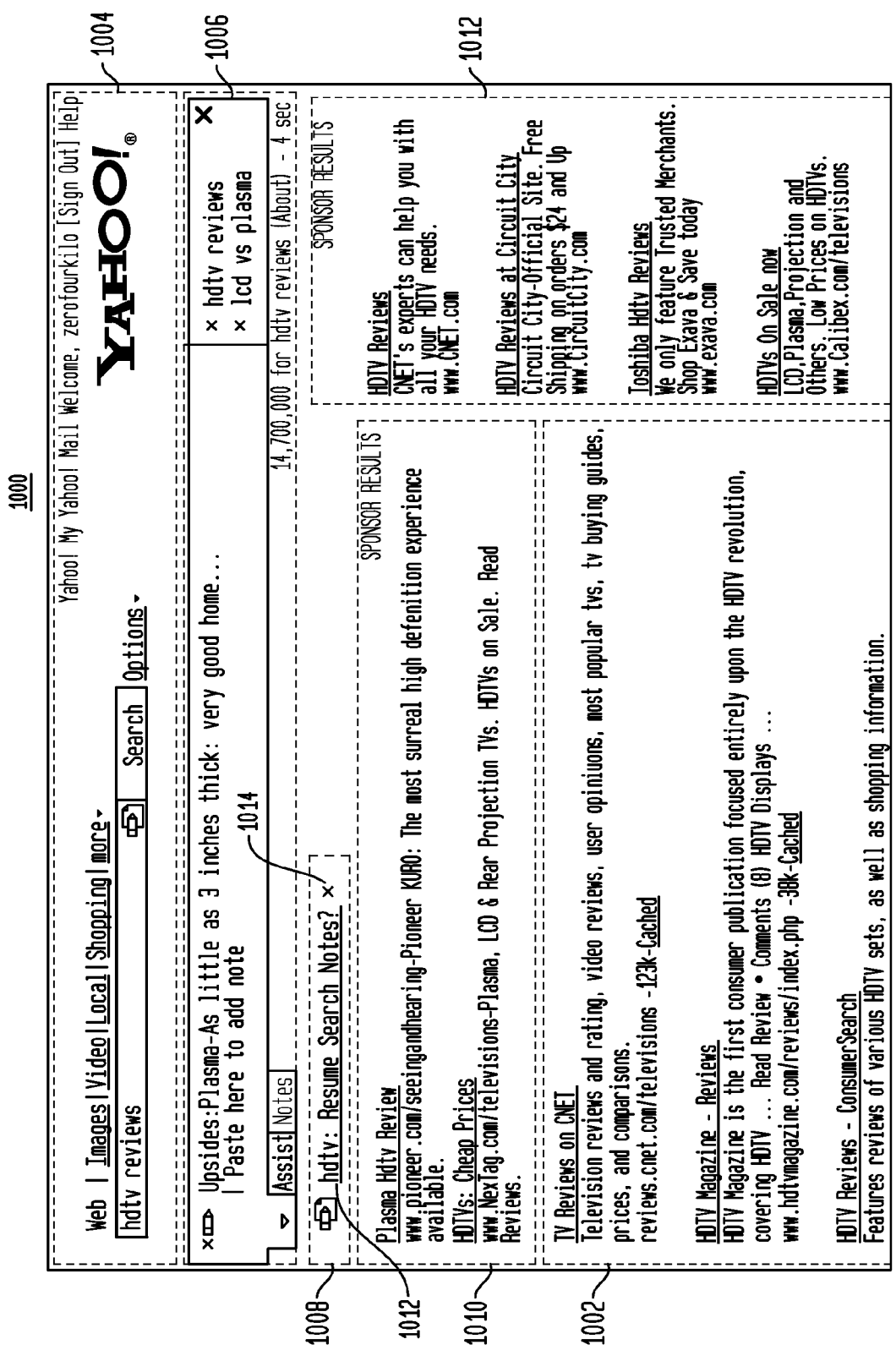
FIG. 10 is an illustration of yet another search results page that includes a means for accessing a research document implemented as an on-page drop down window or panel in accordance with an embodiment of the present invention.

FIG. 10 depicts yet another search results page 1000 that includes a means for accessing a research document implemented as an on-page drop down window or panel in accordance with an embodiment of the present invention. As shown in FIG. 10, search results page 1000 includes a search results section 1002, a header section 1004, a first research document access section 1006, a second research document access section 1008, and two sections 1010 and 1012 dedicated to sponsored search results. In search results page 1000, first research document access section 1006 and section research document access section 1008 may each be displayed responsive to detection of a research session by research session manager 116.

First research document access section 1006 comprises a condensed version of the research document (similar to research document access section 906) that appears in an on-page drop down window below header section 1004. Second research document access section 1008 comprises a research document activation link 1012. Research document activation link 1012 is an interface element that, when activated by a user, causes an expanded version of the condensed research tool shown in first research document access section 1006 to be displayed to the user. Research document activation link 1012 advantageously comprises text that describes the topic of the research session that has been detected ("hdtv") as well as text that asks the user whether or not the user would like to resume taking notes about his/her research. The reference to resuming taking notes in research tool activation link 1012 indicates that the research session detected by research session manager 116 is an extension of a pre-existing research session associated with the user. Second research document access section 1008 also includes a cancellation element 1014 (denoted with an "X") that allows a user to decline the invitation to resume the research session.

Figure 11A:
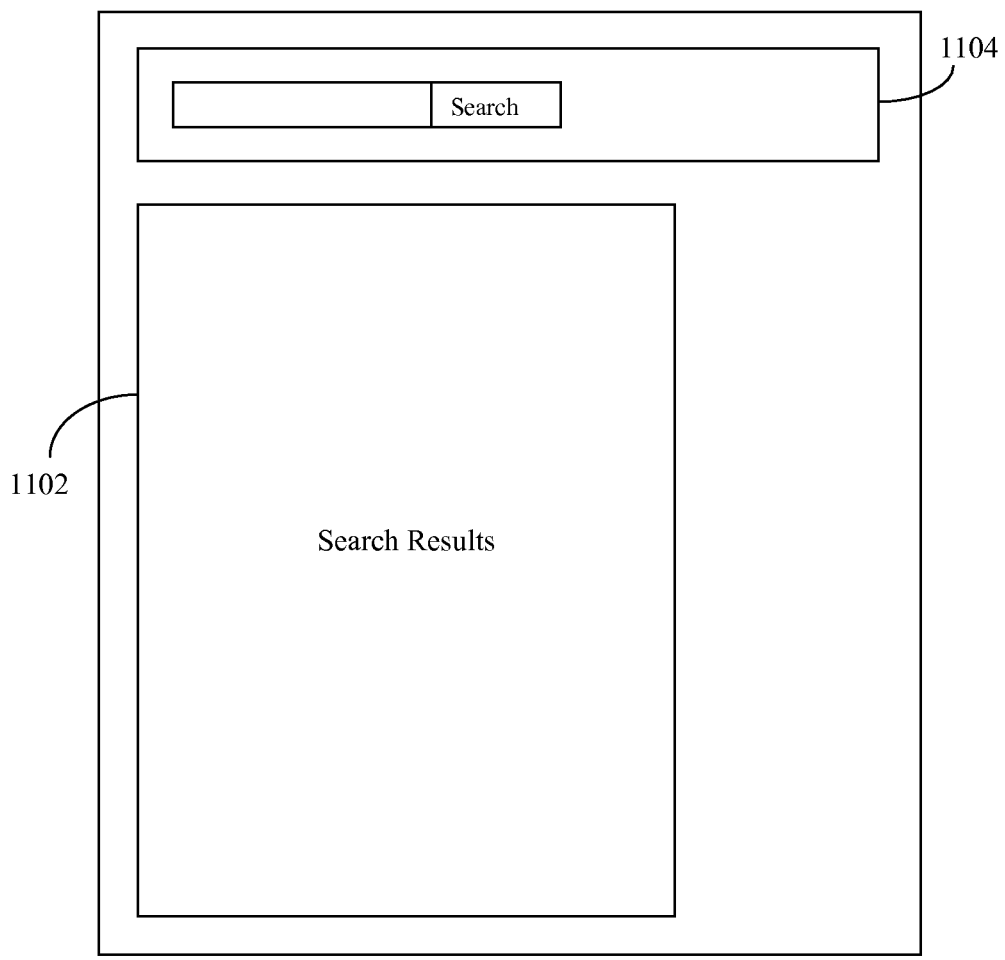
FIGS. 11A and 11B illustrate a search results page and a research document preview element that is overlaid thereon responsive to the detection of a research session in accordance with an embodiment of the present invention.
Figure 11B:
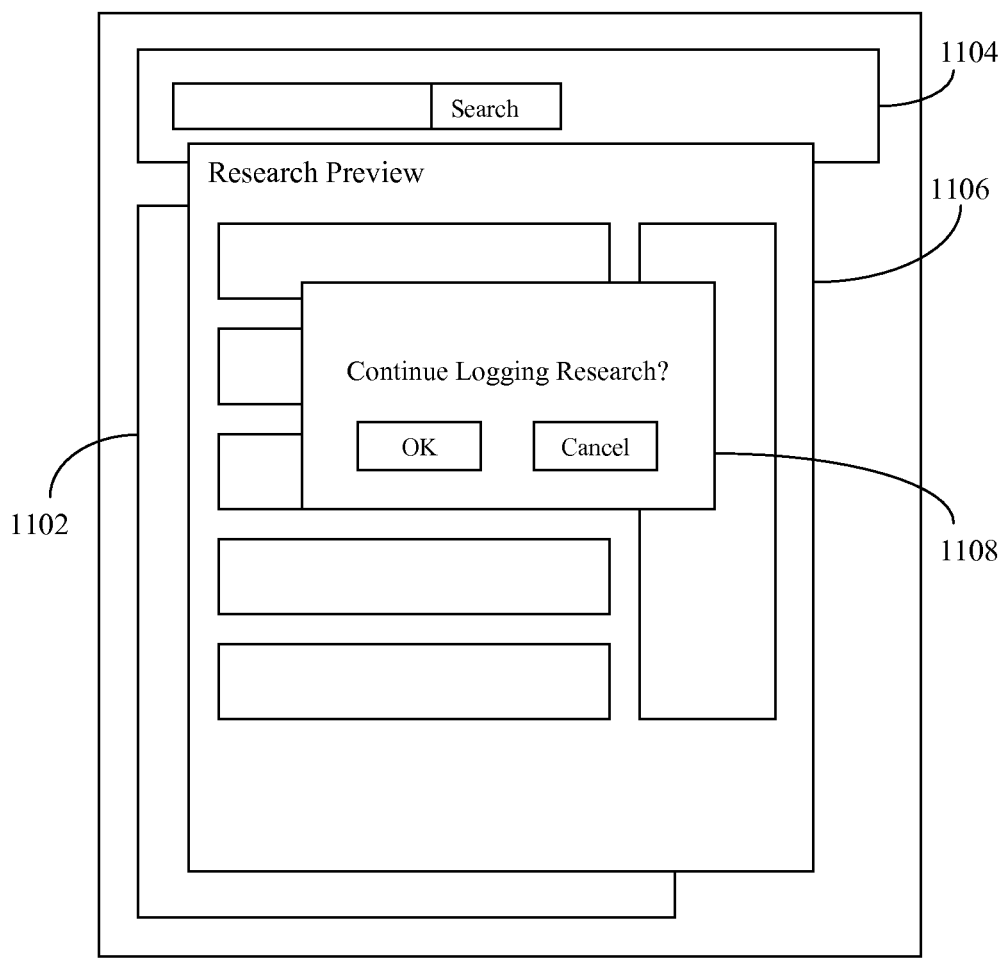

FIGS. 11A and 11B illustrate a search results page 1100 and a research document preview element 1106 that is overlaid thereon responsive to the detection of a research session in accordance with an embodiment of the present invention. As shown in FIG. 11A, search results page 1100 includes a search results section 1102 and a header section 1104. As shown in FIG. 11B, responsive to the detection of a research session by research session manager 116, a research document preview element 1106 is overlaid on search results page 1100. Research document preview element 1106 provides a representation of what the research document would look like should a user choose to access it. As further shown in FIG. 11B, a decision box 1108 is also overlaid on search results page 1100. Decision box 1108 requires a user to either accept continued logging of research by clicking on "OK," which will cause the research document to be maintained, or to cancel the continued logging of research by clicking on "Cancel," in which case the research document will be discarded.

b. Research Document Features and Functionality

A research document in accordance with an embodiment of the present invention is configured to maintain information implicitly generated through the interaction of a user with an information retrieval system while performing research as well as data explicitly provided or collected by the user, such as retrieved document content and user notes, in a manner that is highly-organized and easy to access, augment, and maintain. Various research documents that may be delivered from research session manager 116 to any of computers 104a-104c in accordance with embodiments of the present invention will now be described. However, these research documents are described by way of example only and are not intended to limit the present invention.

Figure 12:
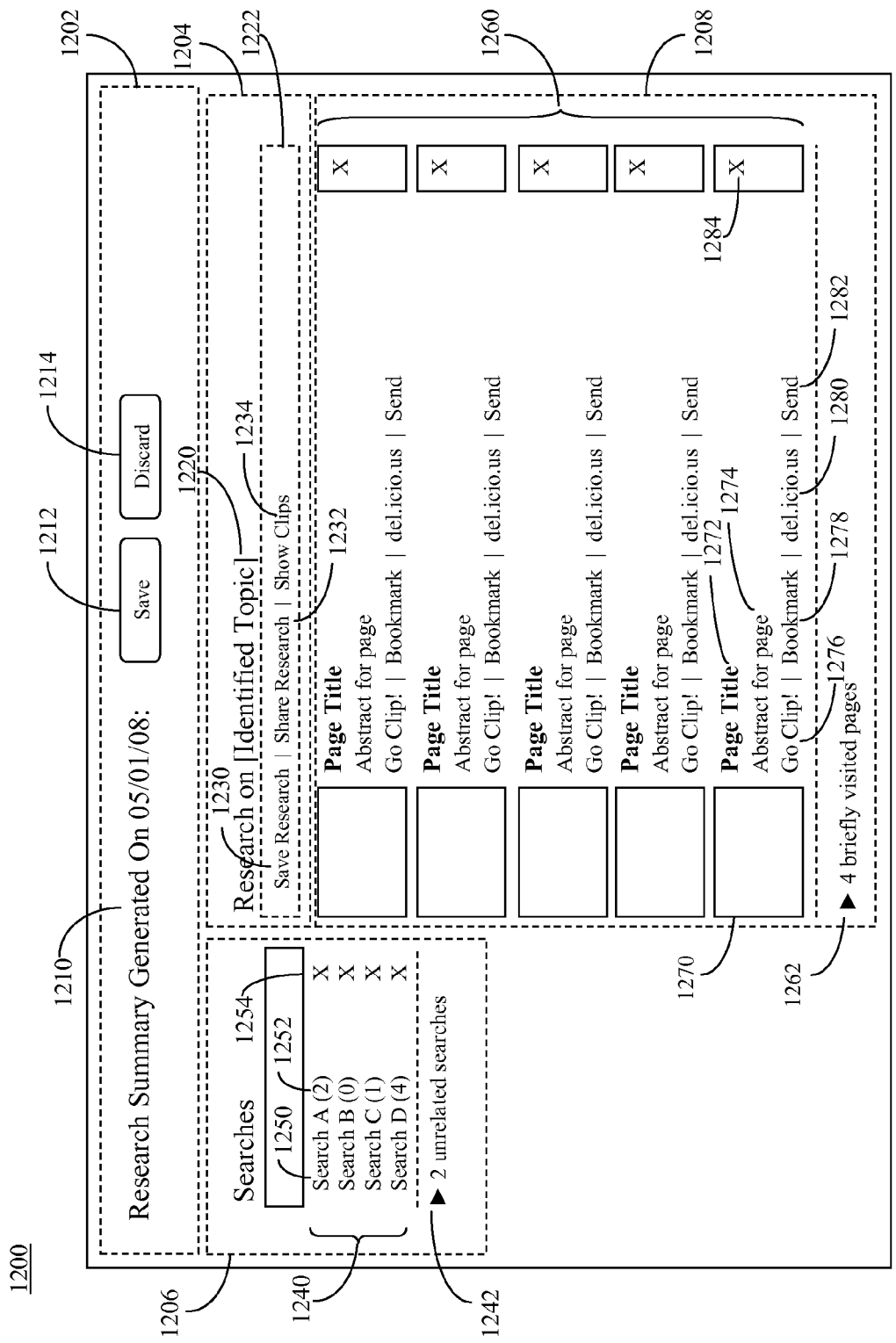
FIG. 12 depicts a research document in accordance with one embodiment of the invention.

As a first example, FIG. 12 depicts a research document 1200 in accordance with one embodiment of the invention. Research document 1200 may be displayed in a dedicated window on a display device associated with any of computers 104a-104c. For example, in one embodiment, research document 1200 may be displayed in a dedicated window that is overlaid upon a window in which a search results page is displayed. As shown in FIG. 12, research document 1200 includes a first header section 1202, a second header section 1204, a search information section 1206 and a document information section 1208.

First header section 1202 includes a text portion 1210, a save button 1212 and a discard button 1214. Text portion 1210 identifies a date upon which research document 1200 was generated. Save button 1212 is a user interface element that, when activated by a user, causes research session manager 116 to save information used to generate research document 1200 so that it may be recreated at a later time. Discard button 1214 is a user interface element that, when activated by a user, causes research session manager 116 to discard certain information used to generate research document 1200.

Second header section 1204 includes a text section 1220 and a research document operations section 1222. Text section 1220 includes a textual description of the research topic about which research document 1200 has been generated. As discussed in Section B.1.b above, research session manager 116 may be configured to identify the research topic by analyzing queries submitted by the user of search engine 106 and/or information associated with documents identified by search engine 106 responsive to such queries. In one embodiment, the portion of text section 1220 that describes the research topic may be edited by the user. This advantageously allows the user to modify or rename the search topic in the case where the user is not happy with the description generated by research session manager 116. When research document 1200 is saved, research session manager 116 may store the user-edited search topic name so that it can be accessed and displayed when the research document is later recreated.

Research document operations section 1222 includes a plurality of user interface elements, each of which, when activated by the user, causes a function to be performed with respect to the content of research document 1200. In particular, a first user interface element 1230 comprises an element that, when activated by the user, causes research session manager 116 to save information used to generate research document 1200 so that it may be recreated at a later time. A second user interface element 1232 comprises an element that, when activated by the user, causes research session manager 116 to provide a means by which information used to generate research document 1200 may be shared with another user. Such means may include, but are not limited to, point-to-point communication means based on e-mail or instant messaging as well as broader distribution means such as means for publishing the information to a publicly-accessible Web site. A third user interface element 1234 comprises an element that, when activated by the user, causes research session manager 116 to provide a means for displaying content extracted by the user from one or more of the documents about which information is provided in document information section 1208.

Search information section 1206 provides information about searches or queries previously submitted by the user. Search information section 1206 is advantageously partitioned into a first search information section 1240 that provides information about queries deemed related to the topic being researched by the user and a second search information section 1242 that provides information about queries deemed unrelated to the topic being researched by the user. The division of queries submitted by the user into such categories by research session manager 116 was described above in Section B.1.c.

As shown in FIG. 12, for each query deemed related to the research topic, first search information section 1240 displays the query term(s) 1250, the number of documents identified in response to the query that were accessed by the user 1252, and a cancellation element 1254. Cancellation element 1254 is a user interface element that, when activated by the user, causes research session manager 116 to remove the query from first search information section 1240. Responsive to activation of cancellation element 1254, research session manager 116 may also discard the query from the set of data used to build research document 1200 or move the query to second search information section 1242 dealing with unrelated queries, depending upon the implementation.

In one embodiment, each query displayed in first search information section 1240 is itself a user interface element, such as a link, that may be activated by the user. In such an embodiment, when a query is activated by the user, information about the documents identified by search engine 106 responsive to the query that were accessed by the user is displayed in document information section 1208. Thus, research document 1200 may present information about documents deemed related to the research topic in association with the queries used to identify them. This advantageously provides a convenient and logical means for organizing such information. The maintenance of an association between documents deemed related to the research topic and the queries used to identify them by research session manager 116 was described above in Section B.1.d.

Second search information section 1242 within search information section 1206 includes a user interface element in the form of a link that, when activated by the user, causes research session manager 116 to display the searches deemed unrelated to the research topic. The searches deemed unrelated to the research topic may be displayed in a like manner to the searches deemed related to the research topic, although this is only an example. As shown in FIG. 12, the link in second search information section 1242 may comprise text that indicates the number of queries deemed unrelated to the search topic. The provision of a link to queries deemed unrelated to the search topic advantageously conserves the limited display space within research document 1200 while still providing the user with access to such queries.

Document information section 1208 provides information about documents identified by search engine 106 responsive to the queries shown in search information section 1206 and accessed by the user. As shown in FIG. 12, the information provided within document information section 1208 is advantageously partitioned into a first document information section 1260 that provides information about documents that have been deemed more than briefly visited or accessed by the user and a second document information section 1262 that provides information about documents that have been deemed only briefly visited or accessed by the user. The division of documents accessed by the user into such categories by research session manager 116 was described above in Section B.1.d.

For each document identified in first document information section 1260, a number of items of information are provided. These items include a graphic element 1270, a document title 1272 and a document abstract 1274. Graphic element 1270 comprises an image of the document itself. For example, in an implementation in which the document is a Web page, graphic element 1270 may comprise a thumbnail image of the Web page or a portion thereof. Document title 1272 comprises a title associated with the document. For example, in an implementation in which the document is a Web page, document title 1272 may comprise the title of the Web page. Document abstract 1274 comprises a textual summary of the document. For example, in an implementation in which the document is a Web page, document abstract 1274 may comprise an abstract or summary associated with the Web page. Such an abstract or summary may be generated or stored by search engine 106.

In one embodiment, each of document title 1272 and document abstract 1274 is editable by the user. This advantageously allows the user to modify or re-create the document title or abstract so that these fields include information that is more useful or desirable from the user perspective. When research document 1200 is saved, research session manager 116 may store the user-edited document titles and abstracts so that those fields can be accessed and displayed when the research document is later recreated.

For each document identified in first document information section 1260, a number of user interface elements are provided as well. As shown in FIG. 12, these user interface elements include a first user interface element 1276, a second user interface element 1278, a third user interface element 1280, a fourth user interface element 1282 and a fifth user interface element 1284. First user interface element 1276 comprises an element that, when activated by the user, causes research session manager 116 to provide a means for selectively extracting (or "clipping") content from the associated document. Second user interface element 1278 and third user interface element 1280 each comprise elements that, when activated by the user, cause research session manager 116 to provide a means for creating and/or storing an Internet bookmark associated with the document so that the document can be easily retrieved by the user. Fourth user interface element 1282 comprises an element that, when activated by the user, causes research session manager 116 to provide a means for sending information about the document to another user. Such means may include, but are not limited to, point-to-point communication means based on e-mail or instant messaging. Fifth user interface element 1284 comprises an element that, when activated by the user, causes research session manager 116 to remove the information about the document from first document information section 1260 and to discard the information associated with that document.

Second document information section 1262 includes a user interface element in the form of a link that, when activated by the user, causes research session manager 116 to display information about the documents deemed only briefly visited or accessed by the user. This information may be displayed in a like manner to the information shown in first document information section 1260, although this is only an example. As shown in FIG. 12, the link in second document information section 1262 may comprise text that indicates the number of documents deemed only briefly visited or accessed by the user. The provision of a link to information about documents deemed only briefly visited or accessed by the user advantageously conserves the limited display space within research document 1200 while still providing the user with access to such information.

Figure 13:
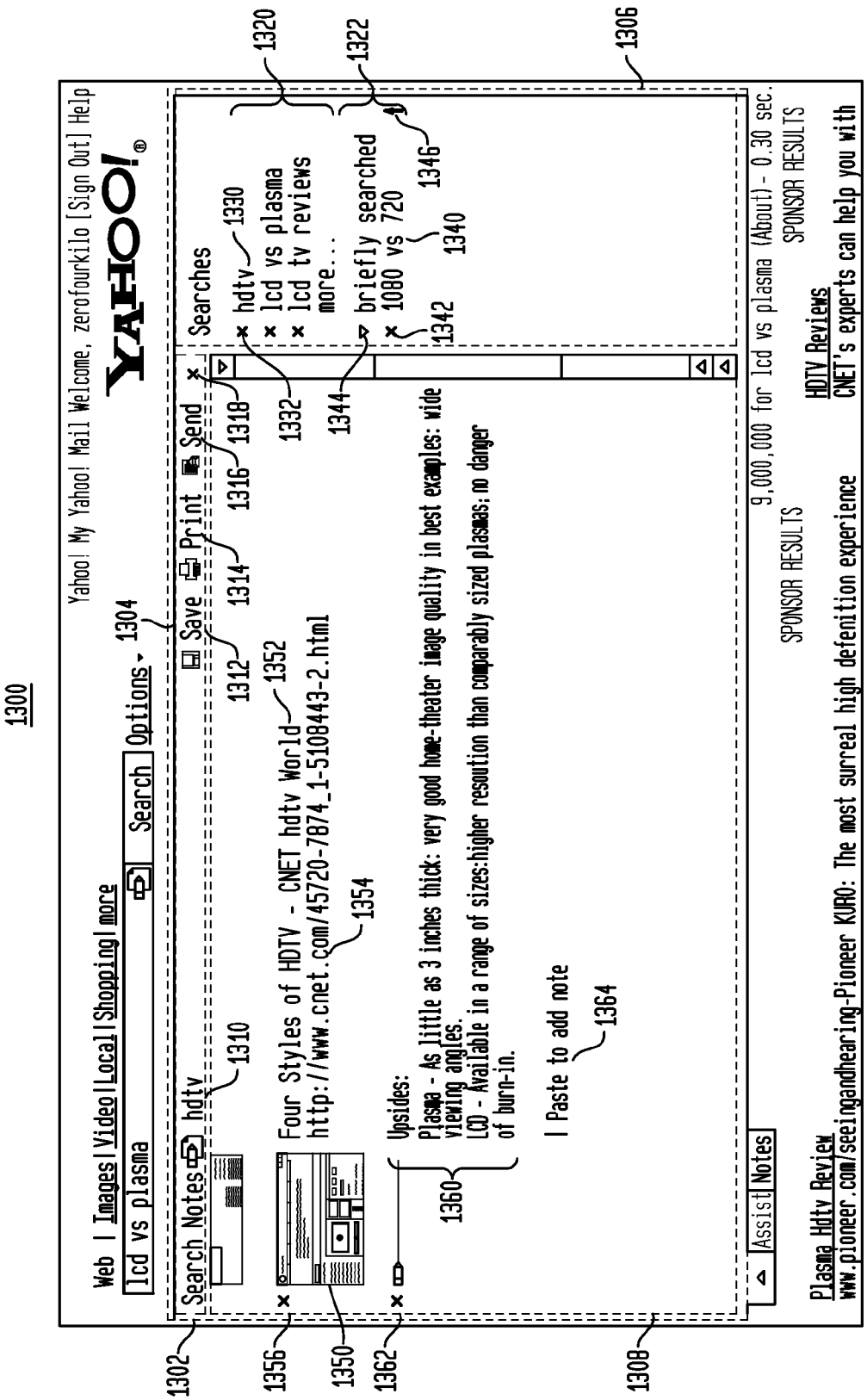
FIG. 13 depicts a research document in accordance with an alternate embodiment of the present invention that is presented in an on-page drop-down window within a search results page.

FIG. 13 depicts a research document 1302 in accordance with an alternate embodiment of the present invention that is presented in an on-page drop-down window of a search results page 1300. As shown in FIG. 13, research document 1302 includes a header section 1304, a search information section 1306, and a document information section 1308.

Header section 1304 includes a text portion 1310 that includes a textual description of the research topic about which research document 1302 has been generated and a number of user interface elements, each of which, when activated by a user, causes a function to be performed with respect to the content of research document 1302. In particular, a first user interface element 1312 comprises an element that, when activated by the user, causes research session manager 116 to save information used to generate research document 1302 so that it may be recreated at a later time. A second user interface element 1314 comprises an element that, when activated by the user, causes research session manager 116 to provide a means by which information used to generate research document 1302 may be printed to a printer associated with any of computers 104*a*-104*c*. A third user interface element 1316 comprises an element that, when activated by the user, causes research session manager 116 to provide a means by which information used to generate research document 1302 may be sent to another user. Such means may include, but are not limited to, point-to-point communication means based on e-mail or instant messaging. A fourth user interface element 1318 comprises an element that, when activated by the user, causes research session manager 116 to discard certain information used to generate research document 1302.

Search information section 1306 provides information about searches or queries previously submitted by the user. Search information section 1306 is advantageously partitioned into a first search information section 1320 that provides information about queries deemed related to the topic being researched by the user and more than briefly searched by the user and a second search information section 1322 that provides information about queries deemed related to the topic being researched by the user but only briefly searched by the user. As noted above, research session manager 116 may be configured to distinguish between queries related to the search topic and queries unrelated to the search topic as well as to distinguish between documents identified in response to such queries that are accessed more than briefly by a user and documents identified in response to such queries that are accessed only briefly by a user. This information may be used by research session manager 116 to place queries into either first search information section 1320 or second search information section 1322.

As shown in FIG. 13, for each query deemed related to the research topic and more than briefly searched, first search information section 1320 displays the query term(s) 1330 and a cancellation element 1332. Cancellation element 1332 is a user interface element that, when activated by the user, causes research session manager 116 to remove the query from first search information section 1320 as well as to discard the query from the set of data used to build research document 1302.

In one embodiment, each query displayed in first search information section 1320 is itself a user interface element, such as a link, that may be activated by the user. In such an embodiment, when a query is activated by the user, information about the documents identified by search engine 106 responsive to the query that were accessed by the user is displayed in document information section 1308. Thus, like research document 1200, research document 1302 may present information about documents deemed related to the research topic in association with the queries used to identify them, thereby providing a convenient and logical means for organizing such information.

Second search information section 1322 includes a first user interface element 1344 that, when activated by the user, causes research session manager 116 to display the queries deemed related to the research topic but only briefly searched and a second user interface element 1346 that, when activated by the user, causes research session manager 116 to hide such queries. As shown in FIG. 13, second search information section 1322 may also comprise text that indicates the number of queries deemed related to the search topic but only briefly searched. Displaying a query within second search information section 1322 comprises displaying both the query term(s) 1340 and a cancellation element 1342. Cancellation element 1342 is a user interface element that, when activated by the user, causes research session manager 116 to remove the query from second search information section 1322 as well as to discard the query from the set of data used to build research document 1302. The ability to hide queries deemed related to the search topic but only briefly searched advantageously allows the limited display space within research document 1302 to be conserved while still providing the user with access to such queries.

Document information section 1308 provides information about documents identified by search engine 106 responsive to the queries shown in search information section 1304 and accessed by the user as well as notes and other information related to the research session.

For each document identified in document information section 1308, a number of items of information are provided. These items include a graphic element 1350, a document title 1352 and a document URL 1354. Graphic element 1350 comprises an image of the document itself. For example, in an implementation in which the document is a Web page, graphic element 1350 may comprise a thumbnail image of the Web page or a portion thereof. Document title 1352 comprises a title associated with the document. For example, in an implementation in which the document is a Web page, document title 1352 may comprise the title of the Web page. Document URL 1354 comprises a URL associated with the document.

For each document identified in document information section 1308, a user interface element 1356 is provided as well. User interface element 1356 comprises an element that, when activated by the user, causes research session manager 116 to remove the information about the document from document information section 1308 and to discard the information associated with that document.

Figure 14:
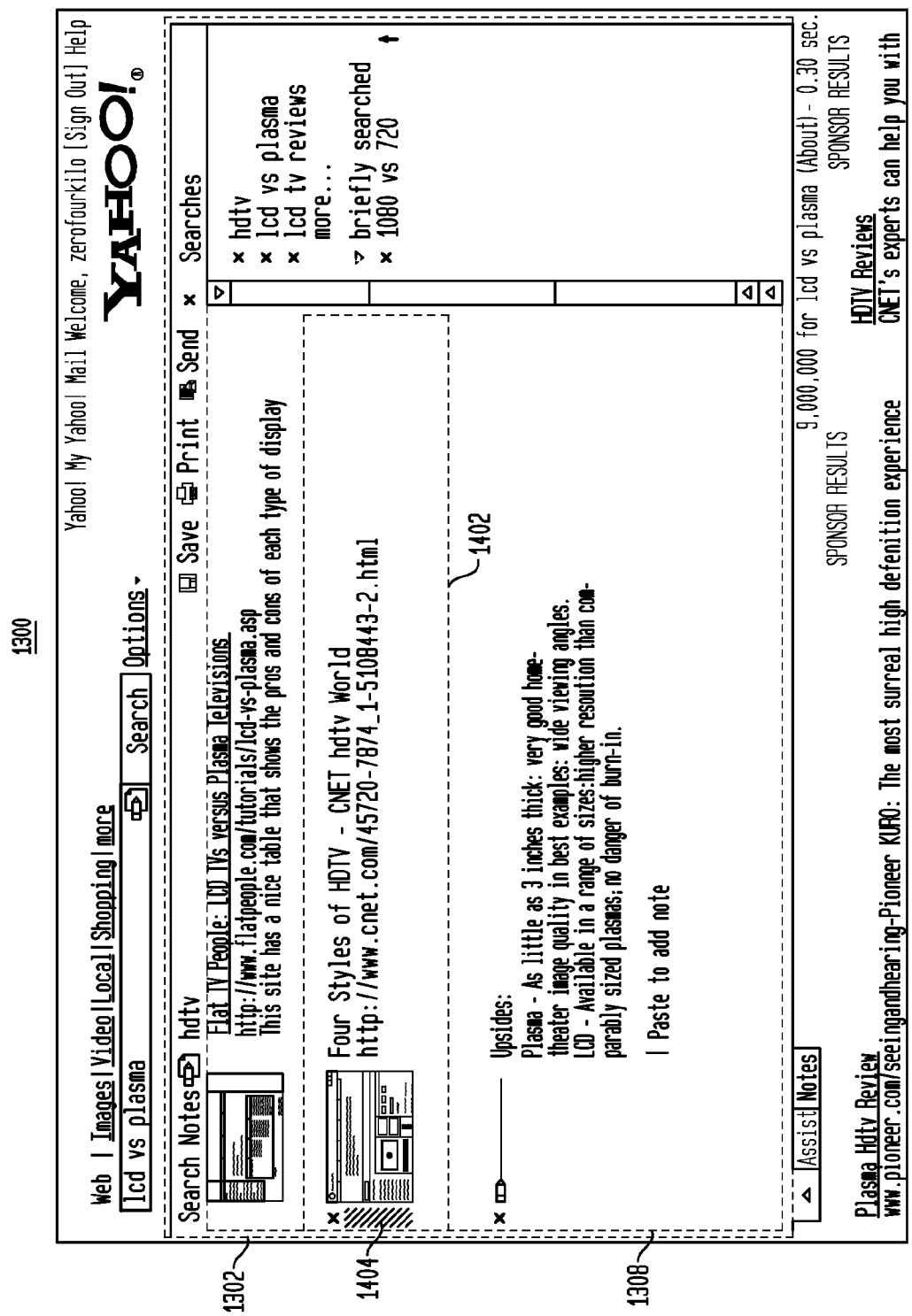
FIG. 14 depicts a research document that includes a moveable document information object in accordance with an embodiment of the present invention.

In accordance with one implementation of research document 1302, the collective information provided for each document in document information section 1308 comprises an object that may be activated by the user and then moved up or down within document information section 1308 relative to other information displayed within that section. This advantageously allows the user to organize and rank information by order of presentation within document information section 1308. An example of such an implementation is depicted in FIG. 14, which shows another view of research document 1302 within search results page 1300. In this view, all of the information associated with the document entitled "Four Styles of HDTV-CNET HDTV World" is highlighted within a row-shaped box 1402, which reflects that this information has been collectively activated as an object by the user. As also shown in FIG. 14, a user interface element 1404 has appeared adjacent to the document image. The appearance of user interface element 1404 indicates that the user may move the document information included in box 1402 up or down relative to other information within document information section 1308. For example, in one implementation, a user may click on box 1402 using a mouse or other input/output (I/O) device and then "drag" box 1402 up or down within document information section 1308.

Figure 15:
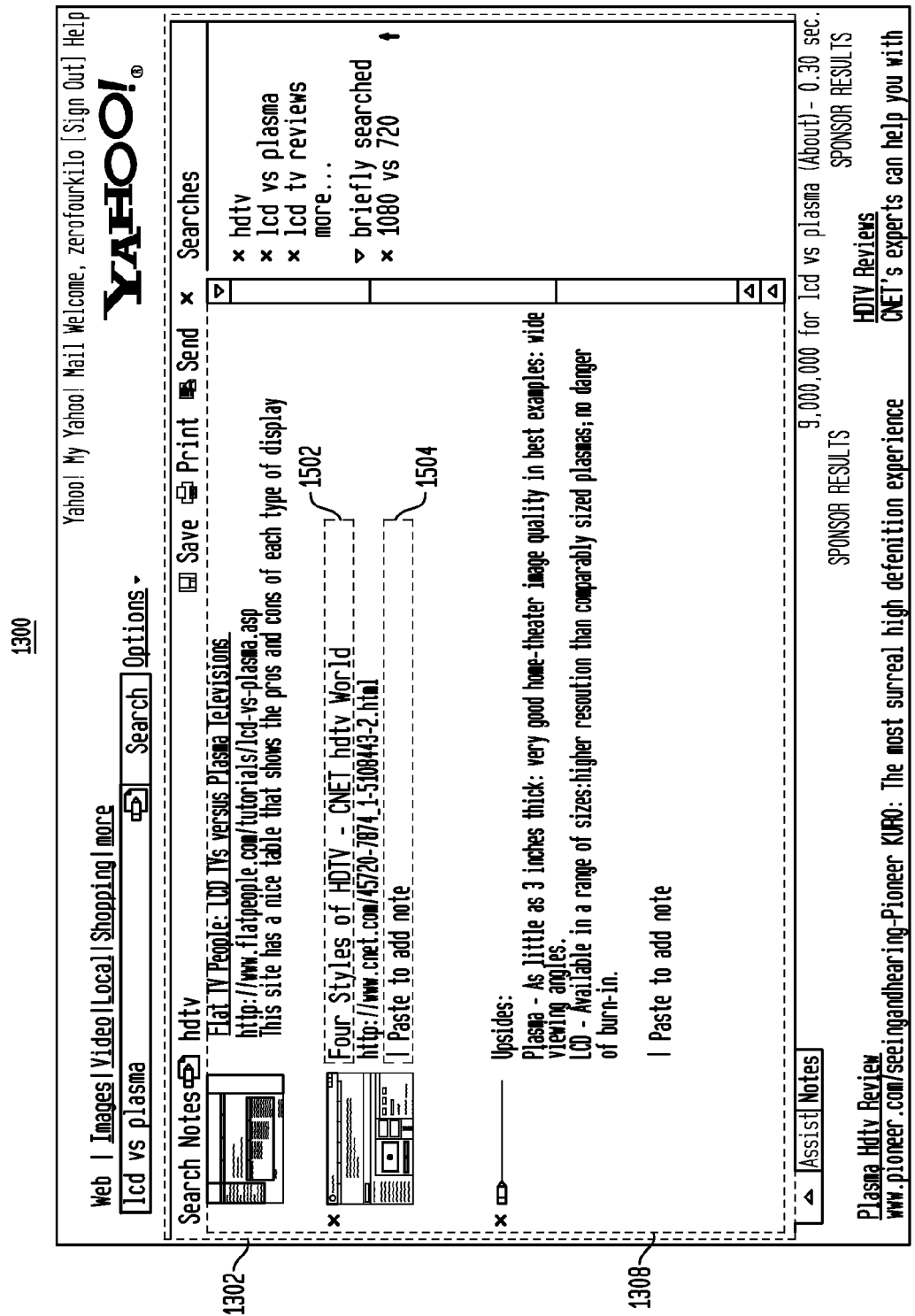
FIG. 15 depicts a research document that includes user-editable document titles and document-related user notes in accordance with an embodiment of the present invention.

In accordance with a further implementation of research document 1302, the title associated with each document identified in document information section 1308 is editable by the user. This advantageously allows the user to modify or re-create a document title so that it includes information that is more useful or desirable from the user perspective. When research document 1302 is saved, research session manager 116 may store the user-edited document titles so that those titles can be accessed and displayed when the research document is later recreated. FIG. 15 depicts a view of research document 1302 in which a highlighted area 1502 has appeared around the document title "Four Styles of HDTV-CNET HDTV World" to indicate that the title may now be edited by the user. In one implementation, the highlighted area 1502 appears when the user clicks on or otherwise activates the title of the document using a mouse or other I/O device.

In accordance with a still further implementation of research document 1302, a space below the title and URL associated with each document identified in document information section 1308 may be used for adding a note by the user. Such user notes may comprise, for example, content copied from the document or text input by the user, although these are only examples. When research document 1302 is saved, research session manager 116 stores such user notes in association with the documents to which they are adjacent, so that they may be again displayed in association with those documents when the research document is later recreated. By way of example, FIG. 15 depicts a view of research document 1302 in which a highlighted area 1504 populated with the text "Paste to add note" has appeared beneath the information about the document entitled "Four Styles of HDTV-CNET HDTV World." The highlighted field 1504 may be used to add a user note associated with that document. In one implementation, the highlighted field 1504 appears when the user clicks on or otherwise activates the space below the document title and URL using a mouse or other I/O device. The user note may be added, for example, by using a cut and paste function to insert text into highlighted area 1504 or by inputting text using a keyboard or other I/O device. The ability to maintain user notes that are specifically associated with documents in this fashion is a helpful feature that allows users to annotate the research document in an organized fashion.

Returning now to FIG. 13, document information section 1308 also provides the capability of entering and displaying user notes that are not associated with any documents. An example of such a user note is denoted with reference numeral 1360. To enter a note, a data entry area 1364 is also shown. Once a note has been created, it may be deleted through the activation of user interface element 1362 associated with the user note.

3. Storage of Research Document Information

As discussed above, research session manager 116 is configured to obtain information relating to queries submitted by a user, to obtain information relating to documents identified by search engine 106 in response to those queries, and to use such information to automatically generate a research document. In performing these functions, research session manager 116 may store the obtained information in local memory (e.g., a memory device or system connected to a server or servers upon which research session manager 116 is executing), in memory integrated within or connected to any of computers 104*a*-104*c*, or in both.

In one embodiment, research session manager 116 first stores such information in a minimalistic fashion on a client computer system and then transfers such information to local memory associated with research session manager 116 only when the user has indicated that the research document generated by research session manager 116 should be saved. This has the effect of protecting the privacy of the user's research session until such time as the user has committed to saving a research document.

Figure 16:
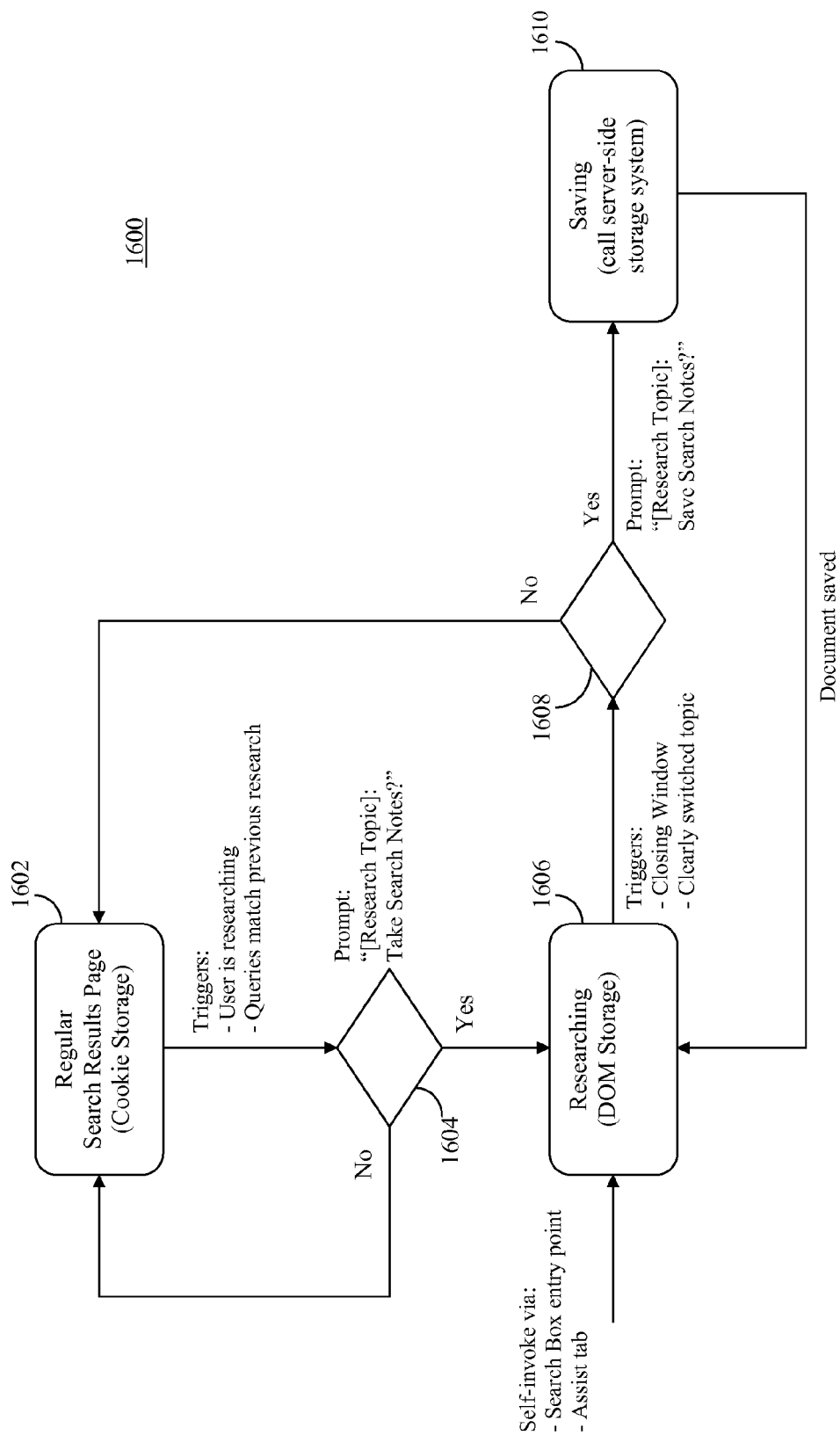
FIG. 16 is a state diagram illustrating the manner in which information used to build a research document is stored during various states of interaction between a user and an information retrieval system in accordance with an embodiment of the present invention.

Such an approach will now be described with respect to a state diagram 1600 depicted in FIG. 16. As shown in FIG. 16, during a non-researching state 1602 in which a user is submitting queries and accessing documents identified on a search results page, information about the queries and accessed documents is stored in a cookie on the client computer system. For example, for each query the following information may be stored in the cookie: the query terms and the position of each document accessed by the user on the search results list generated in response to the query. Thus for example, if a user submitted the query "1989 red corvette" and then accessed the first, third and seventh documents on the search results page generated in response to that query, the information "1989 red corvette [1, 3, 7]" might be stored to the cookie. The information stored in the cookie represents a minimal amount of information from which the user's queries and accessed documents can later be reconstructed by research session manager 116.

During state 1602, if research session manager 116 detects that the user is conducting a research session or determines that queries submitted by the user match research previously performed by the user, then a prompt is generated on the search results page asking the user if he/she would like to take search notes about a particular research topic, wherein the research topic is automatically identified by research session manager 116. As shown at decision step 1604, if the user declines the invitation, then the information stored in the cookie is discarded and the state remains unchanged. However, as also shown at decision step 1604, if the user accepts the invitation, then the state changes to state 1606, in which the user is deemed to be performing research.

As shown in FIG. 16, a user can also enter state 1606 by activating a research document activation icon (such as research document activation icon 732 in FIG. 7) located in the search box on the search results page or by activating an assist tab (such as the notes tab 814 in FIG. 8) below a header section of the search results page.

During state 1606, information about the users queries and accessed documents is stored in a more complete form in a document object model (DOM) associated with the search results page. In this mode of operation, queries, document information including title, URLs and the like, as well as user notes, and the order in which document information and user notes are to be maintained within the research document are all stored in the DOM.

If, during state 1606, the user closes the window in which the search is being conducted or research session manager 116 detects that the user has clearly switched research topics, then a prompt is generated on the search results page asking the user if he/she would like to save the search notes generated about the previous research topic. As shown at decision step 1608, if the user declines the invitation, then the information stored in the DOM is discarded and the state changes back to state 1602. However, if the user accepts the invitation, then the state transitions to state 1610, during which a call is placed to a server-side storage system and the information stored in the DOM is saved to the storage system. After this, the state then transitions back to state 1606.

C. Example Computer System Implementations

Figure 17:
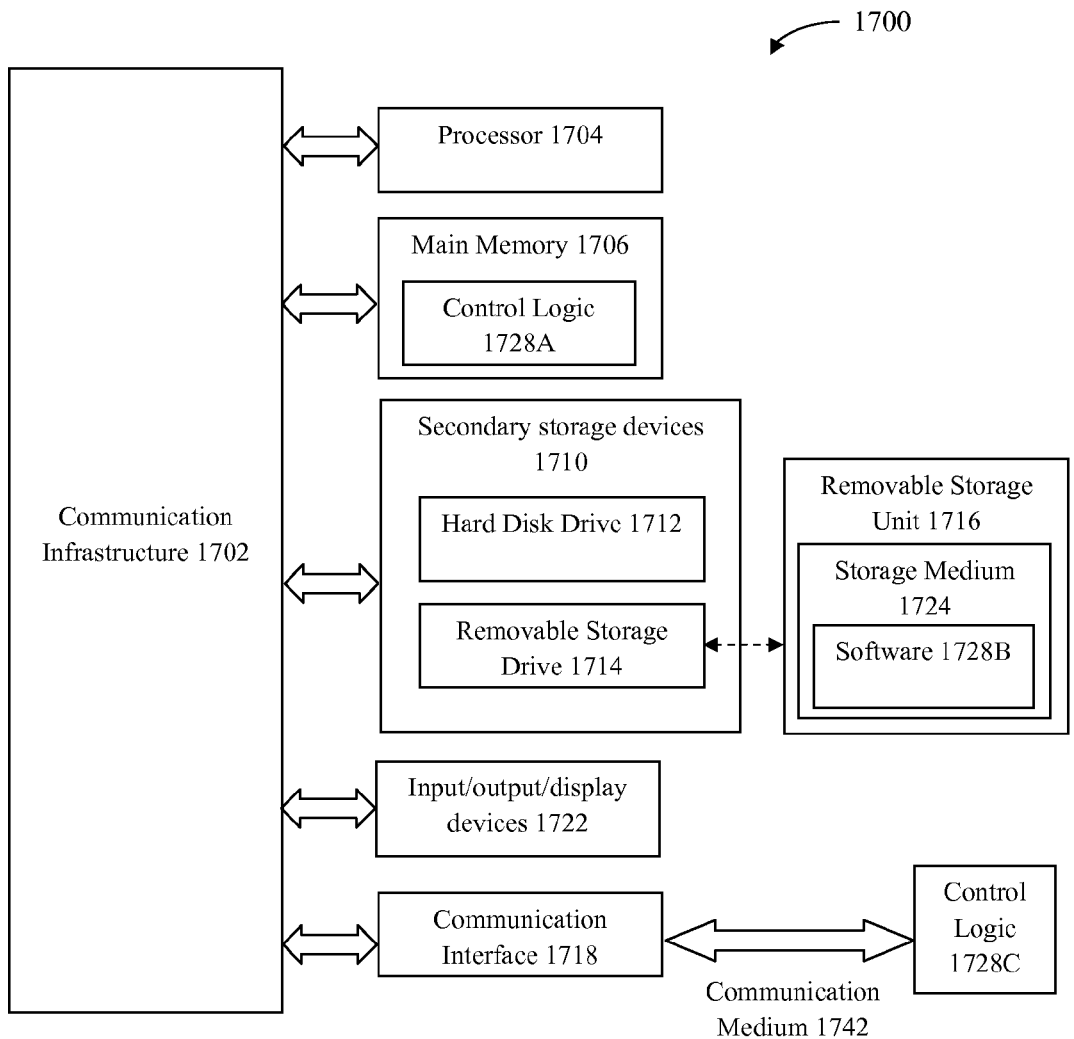
FIG. 17 is a block diagram of an example computer system in which embodiments of the present invention may be implemented.

The embodiments described herein, including systems, methods/processes, and/or apparatuses, may be implemented using well known servers/computers, such as computer 1700 shown in FIG. 17. For example, search engine 106 and research session manager 116 of FIG. 1 as well as the methods described in the flowcharts and state diagrams depicted in FIGS. 3, 4, and 16 can be implemented using one or more computers 1700.

Computer 1700 can be any commercially available and well known computer capable of performing the functions described herein, such as computers available from International Business Machines, Apple, Sun, HP, Dell, Cray, etc. Computer 1700 may be any type of computer, including a desktop computer, a server, etc.

Computer 1700 includes one or more processors (also called central processing units, or CPUs), such as a processor 1704. Processor 1704 is connected to a communication infrastructure 1702, such as a communication bus. In some embodiments, processor 1704 can simultaneously operate multiple computing threads.

Computer 1700 also includes a primary or main memory 1706, such as random access memory (RAM). Main memory 1706 has stored therein control logic 1728A (computer software), and data.

Computer 1700 also includes one or more secondary storage devices 1710. Secondary storage devices 1710 include, for example, a hard disk drive 1712 and/or a removable storage device or drive 1714, as well as other types of storage devices, such as memory cards and memory sticks. For instance, computer 1700 may include an industry standard interface, such a universal serial bus (USB) interface for interfacing with devices such as a memory stick. Removable storage drive 1714 represents a floppy disk drive, a magnetic tape drive, a compact disk drive, an optical storage device, tape backup, etc.

Removable storage drive 1714 interacts with a removable storage unit 1716. Removable storage unit 1716 includes a computer useable or readable storage medium 1724 having stored therein computer software 1728B (control logic) and/or data. Removable storage unit 1716 represents a floppy disk, magnetic tape, compact disk, DVD, optical storage disk, or any other computer data storage device. Removable storage drive 1714 reads from and/or writes to removable storage unit 1716 in a well known manner.

Computer 1700 also includes input/output/display devices 1722, such as monitors, keyboards, pointing devices, etc.

Computer 1700 further includes a communication or network interface 1718. Communication interface 1718 enables computer 1700 to communicate with remote systems and devices. For example, communication interface 1718 allows computer 1700 to communicate over communication networks or mediums 1742, such as LANs, WANs, the Internet, etc. Network interface 1718 may interface with remote sites or networks via wired or wireless connections.

Control logic 1728C may be transmitted to and from computer 1700 via the communication medium 1742. More particularly, computer 1700 may receive and transmit carrier waves (electromagnetic signals) modulated with control logic 1728C via communication medium 1742.

Any apparatus or manufacture comprising a computer useable or readable medium having control logic (software) stored therein is referred to herein as a computer program product or program storage device. This includes, but is not limited to, computer 1700, main memory 1706, secondary storage devices 1710, and removable storage unit 1716. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

D. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method implemented on at least one machine each of which has at least one processor, storage, and a communication platform connected to a network for generating a document, comprising:

obtaining first information related to one or more queries submitted by a user; obtaining second information related to behavior of the user with respect to one or more documents accessed by the user and identified in response to the one or more queries; identifying a research topic based on the first information;

identifying at least one of the one or more documents related to the research topic based on the second information;

estimating an amount of time that a user spends reviewing the at least one of the one or more documents;

generating a research document including information associated with the research topic and the at least one document, wherein generating the research document comprises including, based on the estimated time, each document in the one or more documents in either a first set of documents, or a second set of documents, and the research document is provided to the user by providing a display area comprising a link for the user to review information about the second set of documents, and in a separate display area by providing the user access to information about the first set of documents via a plurality of user interface elements.

2. The method of claim 1, wherein the one or more documents are accessed by the user while interacting with an information retrieval system.

3. The method of claim 1, wherein the research topic is automatically identified based on the one or more documents.

4. The method of claim 1, wherein generating the research document comprises:
automatically generating the research document responsive to determining that the user is performing research about the research topic.

5. The method of claim 1, wherein generating the research document comprises:
automatically generating the research document responsive to user input received via a user interface to a search engine.

6. The method of claim 1, wherein generating the research document comprises including each query in the one or more queries in either a first set of queries deemed related to the research topic or in a second set of queries deemed unrelated to the research topic, and
the research document is provided to the user by providing a display area for the user to review the first set of queries and a user interface element for providing the user access to the second set of queries.

7. The method of claim 1, further comprising providing information about each document deemed related to the research topic in association with a query submitted by the user for which such document was identified.

8. The method of claim 1, further comprising:
providing a research document in which content selected and/or generated by the user may be stored in association with each document deemed related to the research topic.

9. The method of claim 1, further comprising:
storing the first information and the second information on a client computer system associated with the user prior to receiving an indication from the user that the research document should be saved; and
storing the first information and the second information on a server responsive to receiving an indication from the user that the research document should be saved.

10. The method of claim 9, wherein storing the first information and the second information on the client computer system comprises:
storing the first information and the second information in a Web cookie stored in local memory of the client computer system.

11. The method of claim 9, wherein storing the first information and the second information on the client computer comprises:
storing the first information and the second information in a document object model associated with a search results page provided to the user by an information retrieval system.

12. The method of claim 1, wherein the research topic is identified by identifying common terms and/or concepts among the one or more queries.

13. The method of claim 1, wherein the behavior of the user includes: an amount of time the user spent viewing the one or more documents, scrolling, mouse-movements, and text selection by the user.

14. A system comprising:
one or more computers executing a search engine configured to receive one or more queries submitted by a user, to identify one or more documents responsive to receiving each of the one or more queries;
one or more computers executing a research session manager connected to the search engine, the research session manager configured to obtain first information related to the one or more queries and second information related to behavior of the user with respect to the one or more documents identified in response to the one or more queries and accessed by the user, to automatically generate a research document based on at least the first information and the second information;
wherein automatically generating the research document comprises:
automatically identifying a research topic based on the first information, and automatically identifying at least one of the one or more documents related to the research topic based on the second information;
automatically estimating an amount of time that a user spends reviewing the at least one of the one or more documents;
wherein the research session manager is configured to generating a research document including information associated with the research topic and the at least one document, wherein generating the research document comprises including, based on the estimated time, each document in the one or more documents in either a first set of documents, or a second set of documents, and the research document is provided to the user by providing a display area comprising a link for the user to review information about the second set of documents, and in a separate display area by providing the user access to information about the first set of documents via a plurality of user interface elements.

15. The system of claim 14, wherein the one or more documents are accessed by the user while interacting with an information retrieval system.

16. The system of claim 14, wherein the research session manager is further configured to automatically identify the research topic based on the one or more identified documents accessed by the user.

17. The system of claim 14, wherein the research session manager is configured to automatically generate the research document responsive to determining that the user is performing research about the research topic.

18. The system of claim 14, wherein the research session manager is configured to automatically generate the research document responsive to user input received via the user interface to the search engine.

19. The system of claim 14, wherein the research session manager is configured to include each query in the one or more queries in either a first set of queries deemed related to the research topic or in a second set of queries deemed unrelated to the research topic and to provide a research document to the user that includes a display area for the user to review the first set of queries and a user interface element for providing the user access to the second set of queries.

20. The system of claim 14, wherein the research session manager is configured to provide the research document to the user by providing information about each document deemed related to the research topic in association with a query submitted by the user for which such document was identified.

21. The system of claim 14, wherein the research session manager is configured to provide a research document to the user in which content selected and/or generated by the user may be stored in association with each document deemed related to the research topic.

22. The system of claim 14, wherein the research session manager is further configured to store the first information and the second information on a client computer system associated with the user prior to receiving an indication from the user that the research document should be saved and to store the first information and the second information on a server responsive to receiving an indication from the user that the research document should be saved.

23. The system of claim 22, wherein the research session manager is configured to store the first information and the second information on the client computer system by storing the first information and the second information in a Web cookie stored in local memory of the client computer system.

24. The system of claim 22, wherein the research session manager is configured to store the first information and the second information on the client computer system by storing the first information and the second information in a document object model associated with a search results page provided to the user by the search engine.

25. A machine-readable tangible and non-transitory medium having information recorded thereon for generating a document, wherein the information, when read by the machine, causes the machine to perform the following:
    obtaining first information related to one or more queries submitted by a user; obtaining second information related to behavior of the user with respect to one or more documents accessed by the user and identified in response to the one or more queries; identifying a research topic based on the first information;
    identifying at least one of the one or more documents related to the research topic based on the second information; and
    estimating an amount of time that a user spends reviewing the at least one of the one or more documents;
    generating a research document including information associated with the research topic and the at least one document, wherein generating the research document comprises including, based on the estimated time, each document in the one or more documents in either a first set of documents, or a second set of documents, and the research document is provided to the user by providing a display area comprising a link for the user to review information about the second set of documents, and in a separate display area by providing the user access to information about the first set of documents via a plurality of user interface elements.

26. The medium of claim 25, wherein the one or more documents are accessed by the user while interacting with an information retrieval system.

27. The medium of claim 25, wherein the research topic is automatically identified based on the one or more documents.

28. The medium of claim 25, wherein generating a research document comprises:
    generating the research document responsive to determining that the user is performing research about the research topic.

29. The medium of claim 25, wherein generating a research document comprises:
    generating the research document responsive to user input received via a user interface to a search engine.

30. The medium of claim 25, wherein generating a research document comprises including each query in the one or more queries in either a first set of queries deemed related to the research topic or in a second set of queries deemed unrelated to the research topic, and
    the research document is provided to the user by providing a display area for the user to review the first set of queries and a user interface element for providing the user access to the second set of queries.

31. The medium of claim 25, wherein the information, when read by the machine, causes the machine to further perform providing information about each document deemed related to the research topic in association with a query submitted by the user for which such document was identified.

32. The medium of claim 25, wherein the information, when read by the machine, causes the machine to further perform providing a research document in which content selected and/or generated by the user may be stored in association with each document deemed related to the research topic.

33. The medium of claim 25, wherein the information, when read by the machine, causes the machine to further perform the following:
    storing the first information and the second information on a client computer system associated with the user prior to receiving an indication from the user that the research document should be saved; and
    storing the first information and the second information on a server responsive to receiving an indication from the user that the research document should be saved.

34. The medium of claim 33, wherein storing the first information and the second information on a client computer system comprises storing the first information and the second information in a Web cookie stored in local memory of the client computer system.

35. The medium of claim 33, wherein storing the first information and the second information on a client computer system comprises storing the first information and the second information in a document object model associated with a search results page presented to the user by the information retrieval system.

* * * * *